United States Patent
Sumioka

(10) Patent No.: US 9,715,124 B2
(45) Date of Patent: Jul. 25, 2017

(54) CONTROL DEVICE, ACTUATOR INCLUDING CONTROL DEVICE, IMAGE BLUR CORRECTION DEVICE, INTERCHANGEABLE LENS, IMAGE PICKUP APPARATUS, AND AUTOMATIC STAGE

(71) Applicant: CANON KABUSHIKI KAISHA, Tokyo (JP)

(72) Inventor: Jun Sumioka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 831 days.

(21) Appl. No.: 14/017,262

(22) Filed: Sep. 3, 2013

(65) Prior Publication Data

US 2014/0071545 A1  Mar. 13, 2014

(30) Foreign Application Priority Data

Sep. 10, 2012  (JP) ................................ 2012-198652
Aug. 28, 2013  (JP) ................................ 2013-176549

(51) Int. Cl.
*G02B 27/64* (2006.01)
*H04N 5/232* (2006.01)
(Continued)

(52) U.S. Cl.
CPC .............. *G02B 27/646* (2013.01); *G03B 5/00* (2013.01); *H02N 2/0015* (2013.01);
(Continued)

(58) Field of Classification Search
CPC  G02B 27/646; G03B 5/00; G03B 2205/0061; G03B 2205/0069;
(Continued)

(56) References Cited

U.S. PATENT DOCUMENTS 5,870,634 A *  2/1999  Sugaya ................... G03B 5/00
                                                         396/52
6,084,334 A    7/2000  Yamamoto et al.
(Continued)

FOREIGN PATENT DOCUMENTS

CN  101630110 A  1/2010
CN  102591105 A  7/2012
(Continued)

OTHER PUBLICATIONS

Chinese Office Action dated Jun. 3, 2015 in counterpart Chinese Patent Application No. 201310404691.7.
U.S. Appl. No. 14/017,269, filed by Jun Sumioka on Sep. 3, 2013.

*Primary Examiner* — Nathan L Laughlin
(74) *Attorney, Agent, or Firm* — Fitzpatrick, Cella, Harper & Scinto

(57) ABSTRACT

A control device includes: a controller that outputs control, signals pertaining to at least two directions, respectively, based on predetermined gains in a normal operation mode, and outputs control signals based on gains set with respect to the two directions, respectively, in a learning operation mode; a controlled amount calculating unit that receives the control signals and outputs signals pertaining to drive parameters with respect to at least two motors, respectively, wherein the controlled amount calculating unit includes: a characteristic difference calculating unit that calculates characteristic differences between at least the two motors based on the control signals; and a gain compensator that corrects controlled amount pertaining to drive parameters of at least the two motors according to the calculated characteristic differences of at least the two motors, and outputs the signals.

23 Claims, 24 Drawing Sheets

(51) Int. Cl.
  *H02N 2/00* (2006.01)
  *G03B 5/00* (2006.01)
  *H02P 25/032* (2016.01)

(52) U.S. Cl.
  CPC ......... *H02N 2/0075* (2013.01); *H02N 2/0095* (2013.01); *H04N 5/23258* (2013.01); *H04N 5/23287* (2013.01); *G03B 2205/0015* (2013.01); *G03B 2205/0061* (2013.01); *G03B 2205/0069* (2013.01); *G03B 2217/005* (2013.01); *H02P 25/032* (2016.02)

(58) Field of Classification Search
  CPC ...... G03B 2205/0015; G03B 2217/005; H02N 2/0095; H02N 2/0015; H02N 2/0075; H02P 25/032
  See application file for complete search history.

(56) References Cited

U.S. PATENT DOCUMENTS

| | | |
|---|---|---|
| 6,332,060 B1 | 12/2001 | Miyamoto et al. |
| 7,835,635 B2 | 11/2010 | Honjo et al. |
| 8,149,324 B2 | 4/2012 | Oikawa |
| 2004/0013420 A1* | 1/2004 | Hara ................... G02B 7/08 396/55 |
| 2008/0278106 A1 | 11/2008 | Fu et al. |
| 2011/0304933 A1 | 12/2011 | Uchiyama |
| 2012/0051194 A1 | 3/2012 | Tsai |

FOREIGN PATENT DOCUMENTS

| | | |
|---|---|---|
| JP | 2008-236820 A | 10/2008 |
| JP | 2009-225503 A | 10/2009 |
| JP | 2010-171616 A | 8/2010 |

* cited by examiner

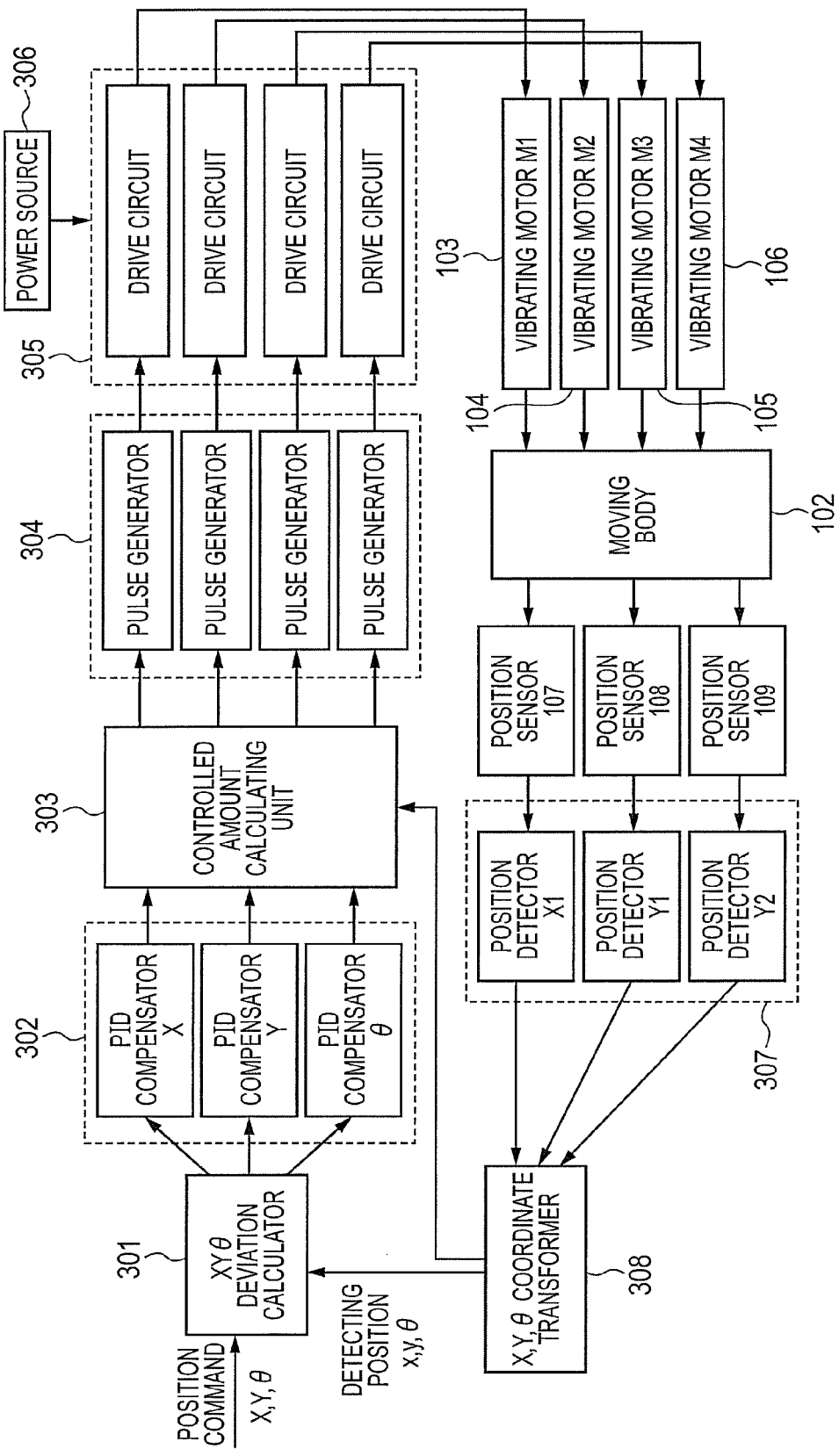

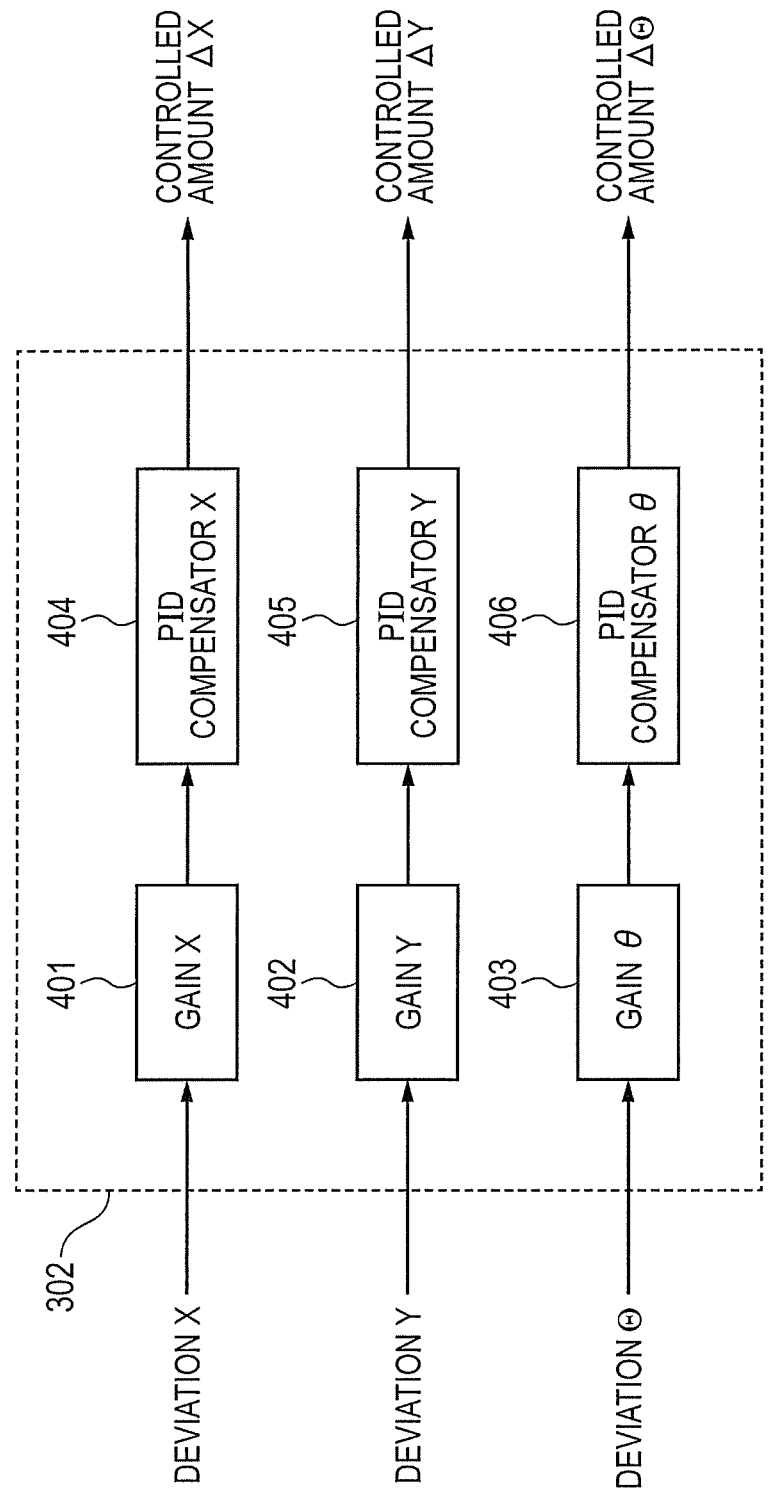

FIG. 6A $$\begin{cases} M1 = \cos(45\deg)\left\{\begin{pmatrix}-\Delta X\\0\end{pmatrix} + \begin{pmatrix}0\\\Delta Y\end{pmatrix} + R\theta\begin{pmatrix}d3\text{-}x\\d3\text{-}y\end{pmatrix}\right\} \\ M2 = \cos(45\deg)\left\{\begin{pmatrix}-\Delta X\\0\end{pmatrix} + \begin{pmatrix}0\\-\Delta Y\end{pmatrix} + R\theta\begin{pmatrix}-d3\text{-}x\\d3\text{-}y\end{pmatrix}\right\} \\ M3 = \cos(45\deg)\left\{\begin{pmatrix}\Delta X\\0\end{pmatrix} + \begin{pmatrix}0\\-\Delta Y\end{pmatrix} + R\theta\begin{pmatrix}-d3\text{-}x\\-d3\text{-}y\end{pmatrix}\right\} \\ M4 = \cos(45\deg)\left\{\begin{pmatrix}\Delta X\\0\end{pmatrix} + \begin{pmatrix}0\\\Delta Y\end{pmatrix} + R\theta\begin{pmatrix}d3\text{-}x\\-d3\text{-}y\end{pmatrix}\right\} \end{cases}$$

FIG. 6B $$R\theta = \begin{bmatrix} \cos(\Delta\Theta)-1 & -\sin(\Delta\Theta) \\ \sin(\Delta\Theta) & \cos(\Delta\Theta)-1 \end{bmatrix}$$

FIG. 6C

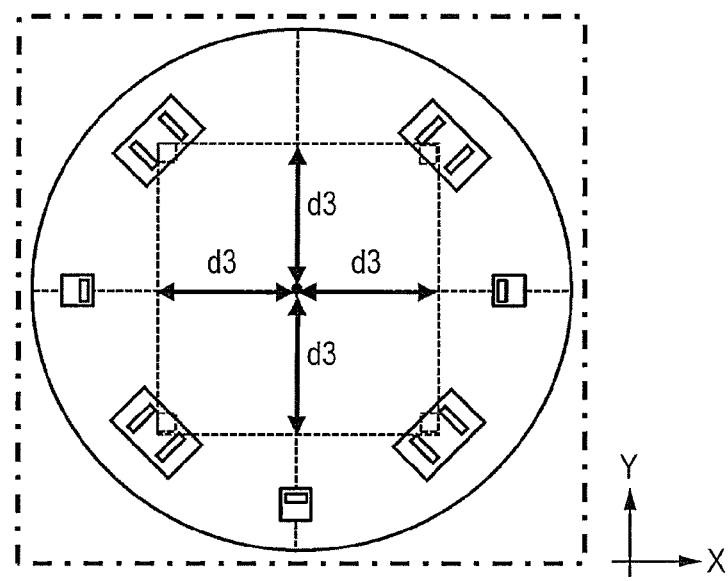

$$\begin{cases} x = X1 - (d1 \cdot \sin\theta) \\ y = (Y1+Y2)/2 \\ \theta = \arcsin\{(Y1-Y2)/(2 \cdot d1)\} \end{cases}$$

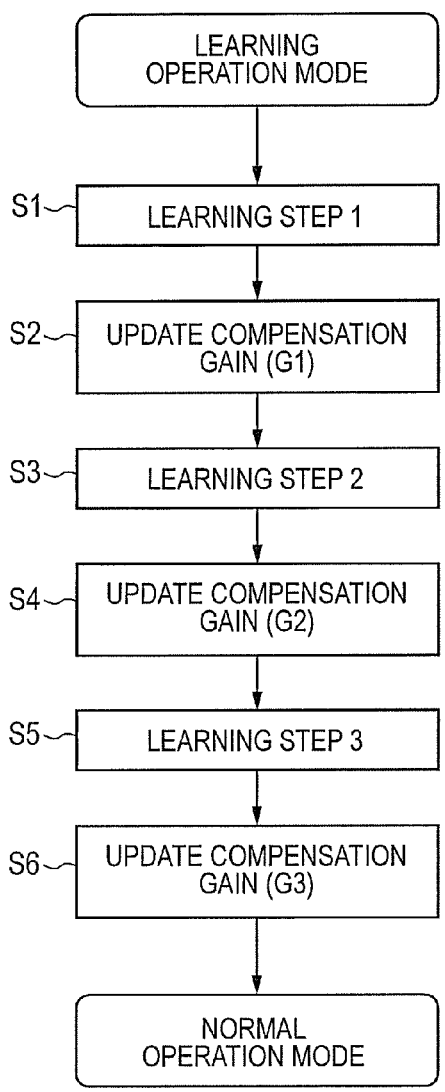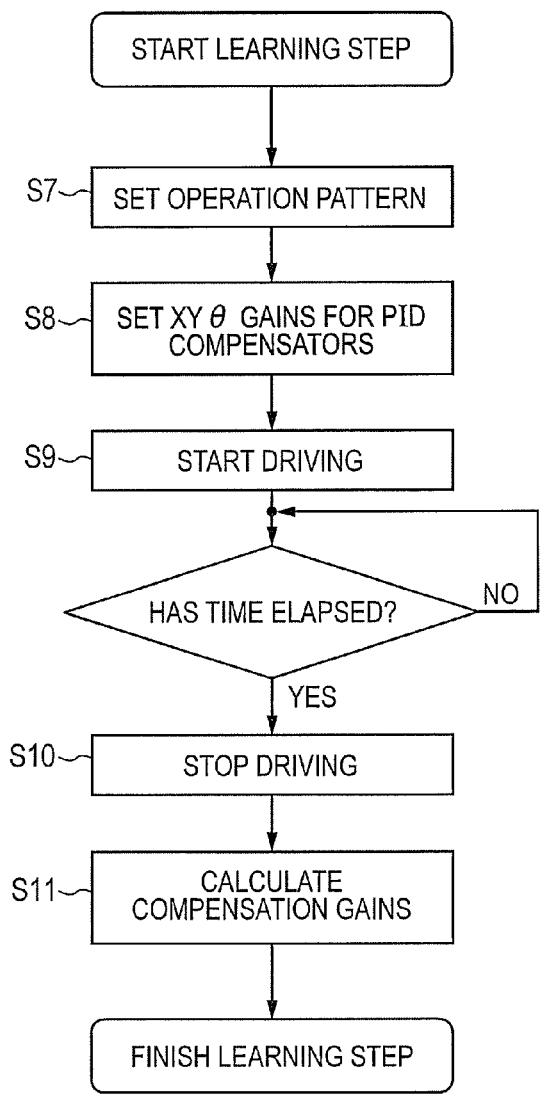
FIG. 9A
FIG. 9B

CONTROL DEVICE, ACTUATOR INCLUDING CONTROL DEVICE, IMAGE BLUR CORRECTION DEVICE, INTERCHANGEABLE LENS, IMAGE PICKUP APPARATUS, AND AUTOMATIC STAGE

BACKGROUND OF THE INVENTION

Field of the Invention

The present invention relates to a control device, an actuator including the control device, an image blur correction device, an interchangeable lens, an image pickup apparatus, and an automatic stage. More specifically, the present invention relates to a control device that compensates individual differences of driving forces of a plurality of motors by learning, and synthesizes the driving forces of the motors, thereby allowing a moving body to move in multiple directions, an actuator including the control device, an image blur correction device, an interchangeable lens, an image pickup apparatus, and an automatic stage.

Description of the Related Art

Conventionally, among actuators capable of driving multiple directions (hereinafter, called a multi-degree-of-freedom drive device), a device that achieves XYθ driving using a linear actuator has been proposed (Japanese Patent Application Laid-Open No. 2009-225503).

FIG. 20A is a diagram illustrating a configuration of a conventional multi-degree-of-freedom drive device. The diagram illustrates a base plate 1, which is a base of the multi-degree-of-freedom drive device, and vibrators 2, 3 and 4 that drive a moving body 5. The diagram also illustrates a position sensor 6 that detects a position in an X direction. The diagram further illustrates position sensors 7 and 8 that detect positions in a Y direction.

FIG. 20B is a side view of the apparatus. The vibrators 2 (not illustrated), 3 and 4, into which vibrating members (top of the vibrators 3 and 4) having one point projection and piezoelectric elements (hatched parts) are integrated by adhesion, are attached to the base plate 1 via attachment members, not illustrated. Scales 6', 7' and 8' are provided on the top surfaces of the position sensors.

For example, when the scale 6' moves in the X direction, the sensor 6 outputs a position signal in response to a movement amount.

When the scale 7' and 8' move in the Y direction, the sensors 7 and 8 output position signals in response to movement amount, respectively. This configuration moves the moving body in a direction into which the driving forces of the vibrators 2, 3 and 4 are vector-synthesized.

Unfortunately, the conventional configuration has a problem in that, if the driving forces of the vibrators 2, 3 and 4 have individual differences, a control system is unstable, control gains cannot be increased, and the positional deviations and responsiveness are reduced.

To solve this problem, there is a method that preliminarily grasps the characteristics of individual motors and selects motors having similar characteristics. However, even it the motors have the same characteristics, variation in state of being actually attached in apparatuses (e.g., pressurization) also causes the problem.

Japanese Patent Application Laid-Open No. 2009-225503 proposes a method that determines the characteristics of individual motors from a movement amount of a moving body or manipulated amount of vibrators in the case of operation in an apparatus state, and sets drive parameters so as to match the characteristics with each other or to optimize the characteristics, thereby accommodating variation in the motors.

SUMMARY OF THE INVENTION

Unfortunately, the conventional arts have the following problems.

That is, actual drive control in multiple directions causes a state where movement amount or manipulated amount in the directions are mixed. Accordingly, it is difficult to accurately extract characteristic differences. As a result, the balance of controlled amount for the respective motors (e.g., vibrators) is lost, and the control system becomes unstable, thereby reducing positional deviation and responsiveness.

In order to accommodate variations, frequencies, drive voltages and pulse widths, which are control parameters, are repeatedly set to match the characteristics with each other. The setting complicates a compensation method.

In view of the problems, the present invention has an object to provide a vibration type driving device that vector-synthesizes driving forces of a plurality of vibrators to allow driving in multiple directions, wherein the apparatus detects and compensates individual differences between the driving forces of the vibrators by a learning operation, thereby allowing controllability to be improved against positional deviation and in responsiveness, and enabling a moving body to be driven in the multiple directions. The present invention also has an object to provide an image blur correction device that includes the vibration type driving device.

An aspect of the present invention relates to a control device, including: a controller that outputs a first control signal pertaining to a first direction and a second control signal pertaining to a second direction crossing the first direction based on predetermined gains in a normal operation mode, and outputs a third control signal and a fourth control signal based on gains set with respect to the first direction and the second direction, respectively, in a learning operation mode; a controlled amount calculating unit that receives the third control signal and the fourth control signal, and outputs a fifth control signal and a sixth control signal pertaining to drive parameters with respect to at least a first motor and a second motor that drive a moving body, respectively, wherein the controlled amount calculating unit includes: a characteristic difference calculating unit that calculates characteristic differences between at least the first motor and the second motor based on the third control signal and the fourth control signal; and a gain compensator that corrects controlled amount pertaining to drive parameters of at least the first motor and the second motor according to the calculated characteristic differences of at least the first motor and the second motor, and outputs the fifth control signal and the sixth control signal.

Another aspect of the present invention relates to an actuator including the control device, an image blur correction device, an interchangeable lens, an image pickup apparatus, or an automatic stage.

Further features of the present invention will become apparent from the following description of exemplary embodiments with reference to the attached drawings.

BRIEF DESCRIPTION OF THE DRAWINGS

FIG. 3 is a diagram illustrating a control, system of the multi-degree freedom vibration wave driving device.

FIG. 4 is a diagram illustrating a control system of PID compensators.

FIG. 6A is a diagram illustrating a matrix operation expression of a multi-input-multi-output matrix calculating unit.

FIG. 6B is a diagram illustrating the matrix operation expression of the multi-input-multi-output matrix calculating unit.

FIG. 6C is a diagram illustrating the matrix operation expression of the multi-input-multi-output matrix calculating unit.

FIG. 9A is a flowchart illustrating a learning operation mode.

FIG. 9B is a flowchart illustrating the learning operation mode.

DESCRIPTION OF THE EMBODIMENTS

Preferred embodiments of the present invention will now be described in detail in accordance with the accompanying drawings.

Embodiment 1

An example will be described that adopts a vibrating multi-degree-of-freedom drive device as an example of an actuator (multi-degree-of-freedom drive device) that can drive a moving body in multiple directions in an embodiment of the present invention.

As an embodiment of the present invention, an example of a configuration will hereinafter be described where a multi-degree-of-freedom drive device including a motor control device of the present invention is applied to a vibration isolation mechanism (image blur correction device) of a camera, which is an optical apparatus. In this embodiment, the example of the configuration mounted on a camera is described. However, the configuration is not limited thereto. As another example, the present invention is applicable to a control device in a stage.

The vibrating multi-degree-of-freedom drive device of this embodiment includes a plurality of vibrators that excites vibrations by applying alternate voltages.

According to the configuration, to drive a moving body in contact with the vibrators by driving forces due to friction forces, the driving forces of the vibrators are vector-synthesized, and the moving body can be driven in multiple directions.

Figure 1A:
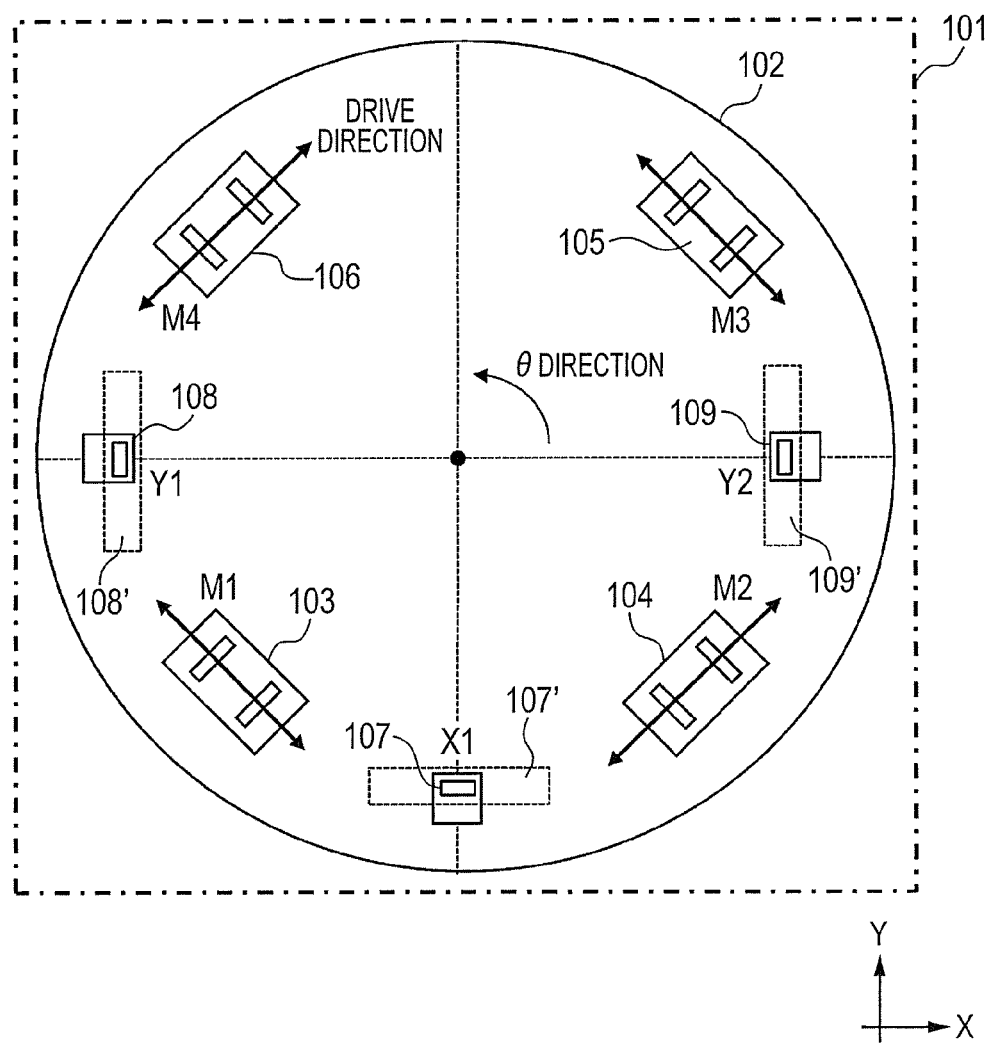
FIG. 1A is a diagram illustrating an example of a configuration of a multi-degree freedom vibration wave driving device.
Figure 1B:
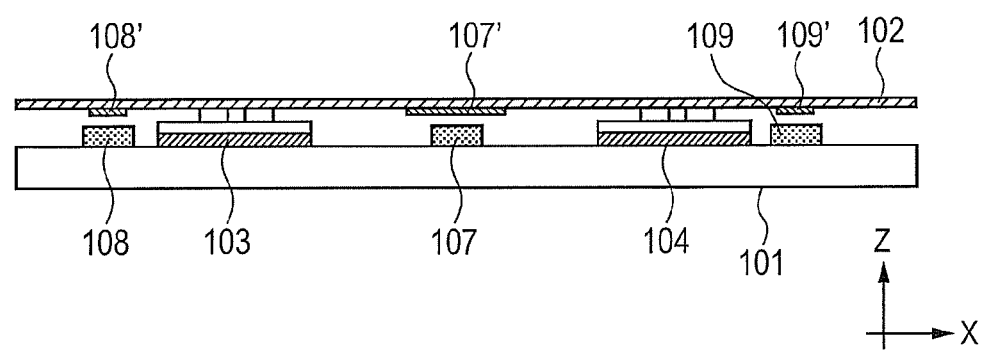
FIG. 1B is a diagram illustrating the example of the configuration of the multi-degree freedom vibration wave driving device.

More specifically, as illustrated in FIGS. 1A and 1B, a linear vibration type driving device is configured so as to achieve driving of the moving body in XYθ directions (first, second and third directions) using a plurality of linear vibrating motors.

A vibration isolation mechanism of a camera detects fluctuation amount in X and Y directions of X and Y coordinates, which are two orthogonal coordinates in a plane, using a two-axis gyro sensor, and generates position command signals X and Y to correct the fluctuation amount.

That is, the multi-degree-of-freedom drive device is controlled cased on the position command signal to move a lens, which is a moving body, thereby allowing vibration isolation of the camera.

FIG. 1A is a diagram illustrating a configuration of a multi-degree-of-freedom drive device of the present invention.

The diagram illustrates a base plate 101 that is a base of a vibrating multi-degree-of-freedom drive device, and vibrating motors 103, 104, 105 and 106 (respective vibrators) that drive a moving body 102.

Here, the moving body 102 is a lens part in the case of application to a vibration isolation mechanism of a camera.

The diagram also illustrates a position sensor 107 that detects a position in the X direction, and position sensors 108 and 109 that detect positions in the Y direction.

FIG. 1B is a side view of the apparatus.

The vibrating motors (respective vibrators) 103, 104, 105 and 106 in which vibrating members having two projections and piezoelectric elements (not illustrated) are integrated by adhesion and attached to the base plate 101 via attachment members.

Scales 107', 108' and 109' are provided on the top surfaces of the position sensors 107, 108 and 109.

For instance, in the case of the sensor 107, movement of the scale 107' in the X direction (first direction) allows the sensor 107 to output a position signal according to a movement amount.

Movement of the scales 108' and 109' in the Y direction (second direction) allows the respective sensors 108 and 109 to output position signals according to movement amount. This configuration moves the moving body in a direction into which driving forces of the vibrating motors 103, 104, 105 and 106 are vector-synthesized.

FIGS. 2A to 2D are diagrams for illustrating a drive principle of the vibrating motor adopted in this embodiment.

Figure 2A:
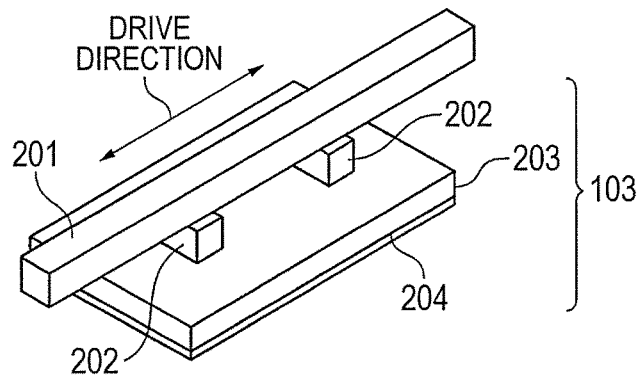
FIG. 2A is a diagram illustrating a drive principle of a linear vibration type driving device.
Figure 2B:
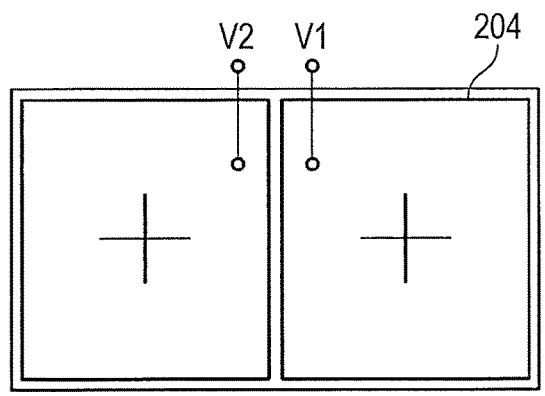
FIG. 2B is a diagram illustrating the drive principle of the linear vibration type driving device.
Figure 2C:
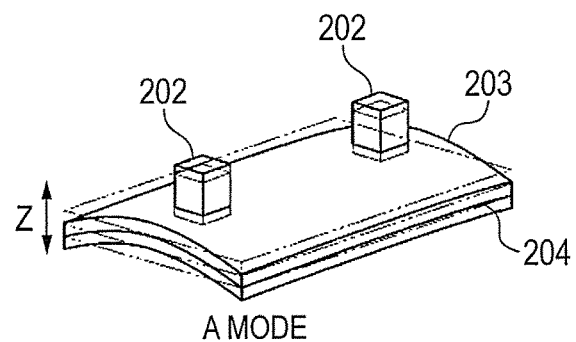
FIG. 2C is a diagram illustrating the drive principle of the linear vibration type driving device.
Figure 2D:
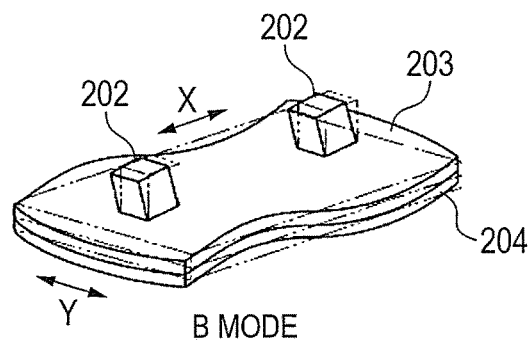
FIG. 2D is a diagram illustrating the drive principle of the linear vibration type driving device.

In FIG. 2A, application of an alternate voltage to a piezoelectric element 204 adhering to an elastic member 203 causes two vibration modes as illustrated in FIGS. 2C and 2D. According to the vibration modes, a moving body 201 in press contact with projections 202 moves in the directions of arrows.

FIG. 2B is a diagram illustrating an electrode pattern of the piezoelectric element 204. For instance, electrode regions halved in the longitudinal direction are formed on the piezoelectric element 204 of the vibrating motor 103.

The polarization direction in each electrode region is the same direction (+). An alternate voltage (V1) is applied to the electrode region residing on the right side in FIG. 2B between the two electrode regions of the piezoelectric element 204. An alternate voltage (V2) is applied to the electrode region residing on the left side.

If the voltages V1 and V2 are alternate voltages that have a frequency around a resonance frequency of an A mode and the same phase, the entire piezoelectric element 204 (two electrode regions) expands at a certain moment and contracts at another moment. As a result, the vibrating motor 103 generates A mode vibrations illustrated in FIG. 2C.

If the voltages V1 and V2 are alternate voltages that have a frequency around a resonance frequency of a B mode and phases different by 180° with each other, the electrode region on the right side of the piezoelectric element 204 contracts and the electrode region on the left side expands at a certain moment.

At another moment, the relationship is inverted. As a result, the vibrating motor 103 generates B mode vibrations illustrated in FIG. 2D.

Thus, the two vibration modes are combined to drive the moving body 201 in the direction of the arrow in FIG. 2A.

The ratio of generation of the A mode and the B mode can be changed by changing the phase difference of the alternate voltages input into the halved electrodes.

In the vibrating motor, the velocity of the moving body can be changed by changing the generation ratio.

FIG. 3 is a diagram illustrating a control system of the multi-degree-of-freedom drive device of the embodiment of the present invention.

The control system, at least, includes a vibrating motor, a moving body, a position sensor, and a control device. Here, for instance, the system includes vibrating motors 103 to 106, a moving body 102, position sensors 107 to 109, and a control device. The control device includes a controller, a pulse generator, a drive circuit, a position detector, and a coordinate transformer. Here, for instance, the control device includes the controller, pulse generators 304, drive circuits 305, position detectors 307, and an XYθ coordinate transformer 308. The controller further includes a deviation calculator, a compensator, and a controlled amount calculating unit. Here, for instance, an XYθ deviation calculator 301, a PID compensator 302, and a controlled amount calculating unit 303.

In the control system, of the multi-degree-of-freedom drive device, position commands X, Y and θ are supplied by the controller, not illustrated, and input into the XYθ deviation calculator 301.

The XYθ deviation calculator 301 calculates the differences between the position commands X, Y and θ and detecting positions X, Y and θ acquired by the XYθ coordinate transformer 308, and outputs X, Y and θ deviation signals. The deviation signals are input into the PID compensator 302, and X, Y and θ control signals are output.

Here, the PID compensator 302, which can be configured by adding outputs of compensators having proportional (P), integral (I) and derivative (D) functions, are used to compensate the phase delay and gain of a control object and construct a stable and highly accurate control system. The PID compensator has a certain control period for feedback control of the controller. A temporal proportional operation, a temporal derivative operation and a temporal integral operation are performed based on the control period. The compensator can be an operator that compensates the phase delay of position data of the moving body with respect to the position command or the gain. The compensator is, for instance, one of an H infinity compensator and a repetitive compensator, each of which is configured to combine operations based on temporal concepts. The compensator, which can also be regarded as a filter, achieves an action based on a temporal concept, i.e., one of actions of increasing and reducing an input signal in response to the frequency. The compensator of the present invention is not limited to the compensator described above, but is any of what can exert the effect described above.

A control signal output from the PID compensator 302 is input into the controlled amount calculating unit 303. X, Y and θ controlled amount are matrix-operated and transformed, and output as controlled amount of the respective four vibrating motors.

In this embodiment, as will be described in detail later, the control device has a configuration including a controller configured as the PID compensator 302, and the controlled amount calculating unit 303, in a path of the control system for feedback control to the position command. The controller is configured to output control signals at predetermined gains in a normal operation mode (e.g., a first control signal pertaining to the X direction as the first direction, and a second control signal pertaining to the Y direction as the second direction), and control signals based on gains set in each of the first and second directions in the learning operation mode (a third control signal and a fourth control signal, respectively).

The controlled amount calculating unit 303 is configured to receive the control signals (the third control signal and the fourth control signal) from the controller, and output signals pertaining to drive parameters of the respective vibrators (the fifth control signal and the sixth control signal) by operation.

The controlled amount output from the controlled amount calculating unit 303, which include information on the frequency, phase difference, and pulse width as control parameters for the vibrating motors, are corrected and input into the pulse generator 304.

The pulse generator 304 generates a pulse signal having a drive frequency that changes according to a control signal pertaining to an input drive parameter. The generator may be any of a digital divider circuit and a VCO (voltage control oscillator).

A pulse signal having a pulse width that is changed according to a control parameter by PWM (pulse width modulation) control may be generated.

The pulse signal output from the pulse generator 304 is input into the drive circuit 305, and alternate voltages having two phases different by 90° are output.

The drive circuit 305 performs switching operation of a DC voltage supplied from a power source 306 at the timing of the input pulse signal. The circuit may be any of a booster circuit using a transformer boosting the voltage to a desired voltage and a booster circuit using LC resonance.

The alternate voltage output from the drive circuit 305 is applied to piezoelectric elements of the vibrating motors 103, 104, 105 and 106 (hereinafter, M1, M2, M3 and M4), and the moving body 102 moves in a direction into which the driving forces of M1, M2, M3 and M4 are vector-synthesized.

The movement of the moving body 102 is detected by the position sensors 107, 108 and 109. The position detector 307 performs operation processes to acquire X1, Y1 and Y2 position information at the positions of the respective sensors.

The X1, Y1 and Y2 position information is input into the XYθ coordinate transformer, and coordinate-transformed into X, Y and θ position information. Thus, this apparatus is subjected to feedback control so as to approach the position commands X, Y and θ.

FIG. 4 is a diagram illustrating the configuration of the PID compensator 302.

Gains are set in the respective X, Y and θ deviation signals, and the PID compensator performs operation and output.

A gain X 401, a gain Y 402 and a gain θ 403 are used in the learning operation mode, and can turn on and off control in each direction or adjust the ratio of the control gains. Control gains optimized based on the transfer characteristics of the four vibrating motors are set in the PID compensator X 404, the PID compensator Y 405 and the PID compensator θ 406.

Figure 5:
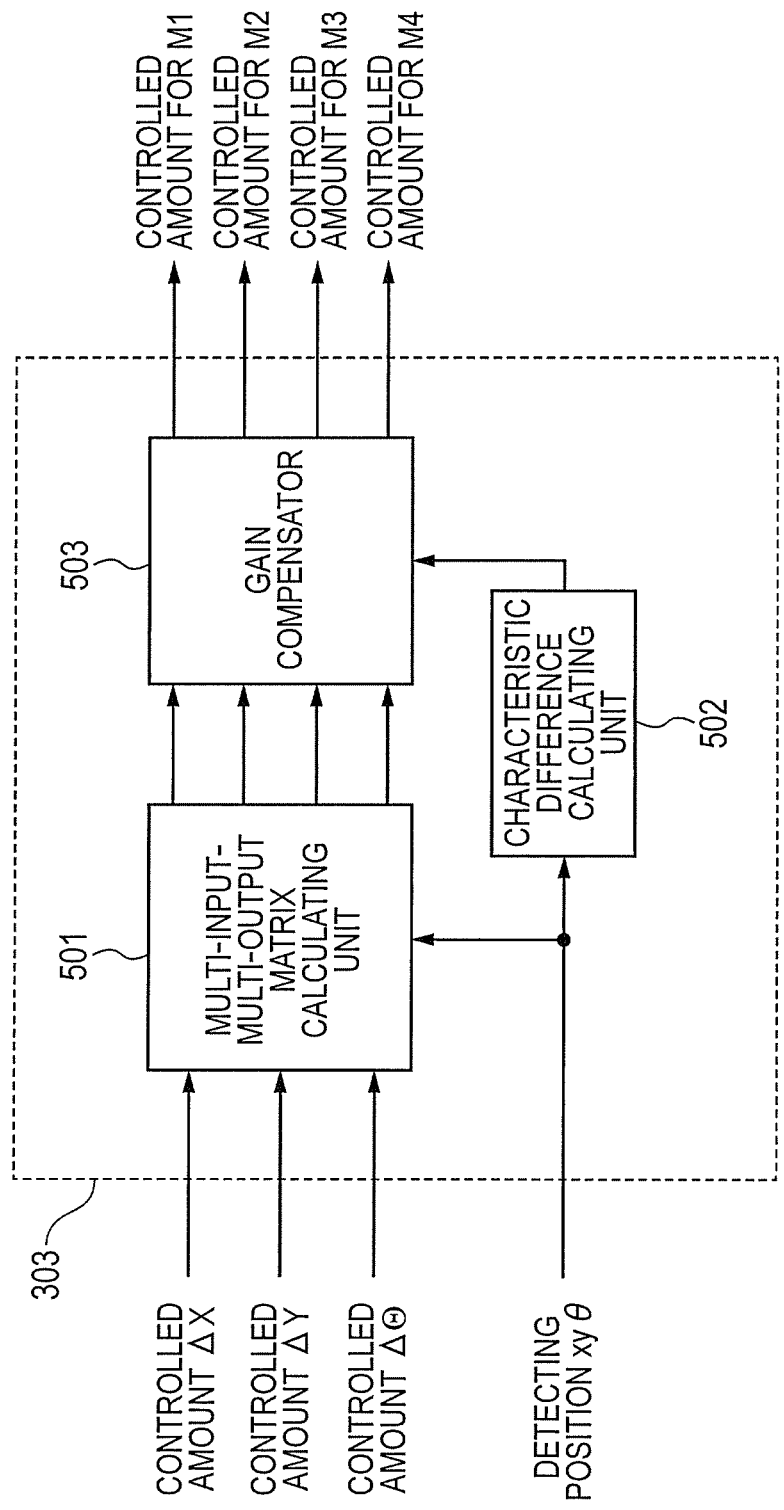
FIG. 5 is a diagram illustrating a configuration of a controlled amount calculating unit.

FIG. 5 is a diagram illustrating the configuration of the controlled amount calculating unit 303.

The control amount pertaining to X, Y and θ are matrix-operated according to the detecting positions X, Y and θ by the multi-input-multi-output matrix calculating unit 501, and output as controlled amount for the respective four vibrating motors.

The gain compensator 503 compensates the individual differences between the four vibrating motors, and outputs control amount for the respective motors. The control flow in the normal operation mode has thus been described.

In the learning operation mode, the individual differences between the vibrating motors are calculated by a characteristic difference calculating unit 502 from the detecting positions X, Y and θ, and the compensation gains calculated after completion of the learning operation are set in the gain compensator 503.

Based on the compensation gain, the frequencies, phase differences and pulse widths, which are the controlled amount of the vibrating motors M1, M2, M3 and M4, are adjusted as a result.

FIGS. 6A to 6C illustrate the matrix operation expression of the multi-input-multi-output matrix calculating unit 501.

FIG. 6A illustrates the controlled amount of the vibrating motors M1, M2, M3 and M4.

The coefficient COS (45 deg) is thus set because the drive axes of the vibrating motors are inclined by 45° from the XY axis.

The first term is a controlled amount ΔX component. The second term is a controlled amount ΔY component. The third term, is a controlled amount Δθ component. The controlled amount ΔX is a controlled amount in which the transfer characteristic in the X direction is reflected. The amount ΔY is a controlled amount in which the transfer characteristic in the Y direction is reflected. The amount Δθ is a controlled amount in which the transfer characteristic in the θ direction is reflected. Accordingly, in the case of a vertical arrangement, the difference in transfer characteristics in the X and Y directions is taken into account as the difference between the controlled amount ΔX and ΔY, and the controlled amount of the vibrating motors are operated. Here, the X and Y components of the vectors of the first and second terms have different signs because setting is made such that all the drive directions of the vibrating motors are in the left rotating direction in the case of application of drive signals having the same phase.

FIG. 6B illustrates a rotation matrix Rθ for operating a controlled amount θ component. The rotation matrix Rθ calculates the amount of rotation of the controlled amount Δθ with reference to the center point (rotationally centered on the center position) using the distance d3 in the X coordinate and the Y coordinate from the center point illustrated in FIG. 6C to each vibrating motor.

When the moving body moves in the X and Y directions, the relative center coordinates with respect to each vibration motor deviate. Accordingly, detecting positions x and y are taken into account as offset components.

FIGS. 7A to 7E are diagrams illustrating the operation of the multi-degree-of-freedom drive device in the X, Y and θ directions.

The apparatus according to this embodiment vector-synthesizes the driving forces of the four vibrating motors M1, M2, M3 and M4, and drives the moving body in the desired direction.

Characteristic operation patterns are picked up and described.

Figure 7A:
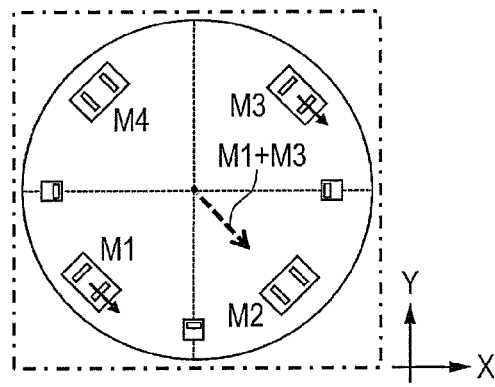
FIG. 7A is a diagram illustrating operations in X, Y and θ directions of the multi-degree freedom vibration wave driving device.

FIG. 7A illustrates the case of driving in a lower right direction. In this case, driving forces in the same direction occur at the motors M1 and M3. Here, a state is desirable where no load occurs in driving of the motors M2 and M4 in the lower right direction.

This method may be a method of exciting the motors M2 and M4 to cause standing waves only with vertical vibrations to thereby reduce the load, or a method of reducing the load by a avoiding mechanism.

Figure 21A:
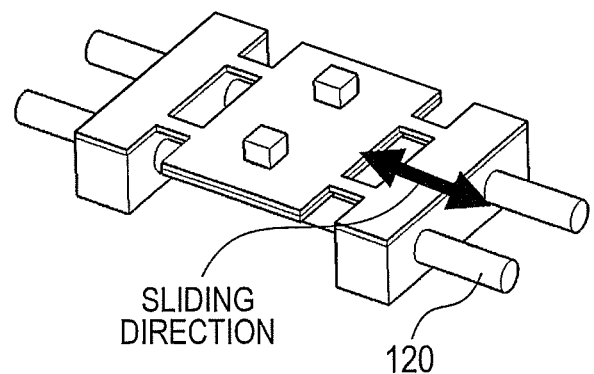
FIG. 21A is a diagram illustrating of an example of a configuration of reducing a load using an avoiding mechanism.
Figure 21B:
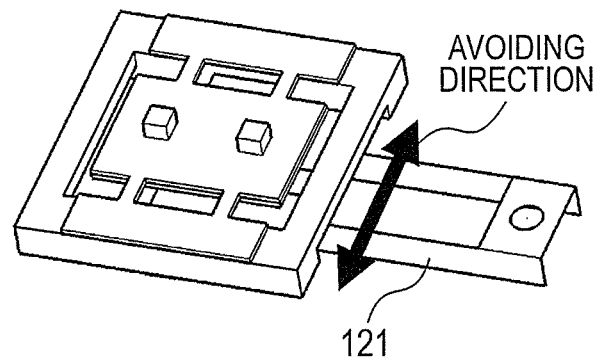
FIG. 21B is a diagram illustrating of an example of a configuration of reducing a load using a avoiding mechanism.

FIGS. 21A and 21B illustrate examples of configurations of reducing loads using avoiding mechanisms.

FIG. 21A illustrates an example of a configuration of adopting a sliding mechanism. The vibrating motor can release the load through a bar 120 fixed to the base plate by sliding in the direction of an arrow.

FIG. 21B is an example of a configuration of adopting a avoiding mechanism. A leaf spring 121 fixed to the base plate has a weak rigidity in the direction of an arrow, and is deformed in the relief direction to allow the vibrating motor to release the load.

Figure 7B:
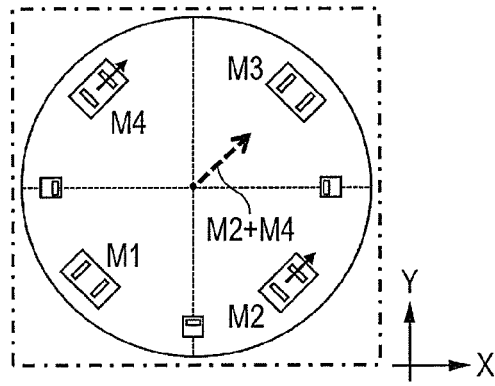
FIG. 7B is a diagram illustrating operations in the X, Y and θ directions of the multi-degree freedom vibration wave driving device.

FIG. 7B illustrates the case of driving in an upper right direction. In this case, driving forces in the same direction at the motors M2 and M4 are caused.

Figure 7C:
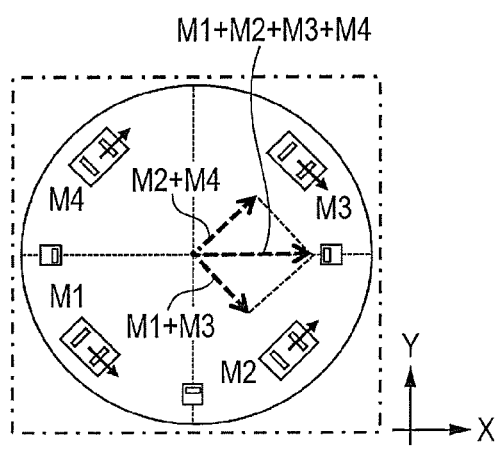
FIG. 7C is a diagram illustrating operations in the X, Y and θ directions of the multi-degree freedom vibration wave driving device.

FIG. 7C illustrates the case of driving in the X direction. If the synthetic vector of the motors M1 and M3 and the synthetic vector of the motors M2 and M4 have the same magnitude, a synthetic vector occurs in the X direction as illustrated.

Figure 7D:
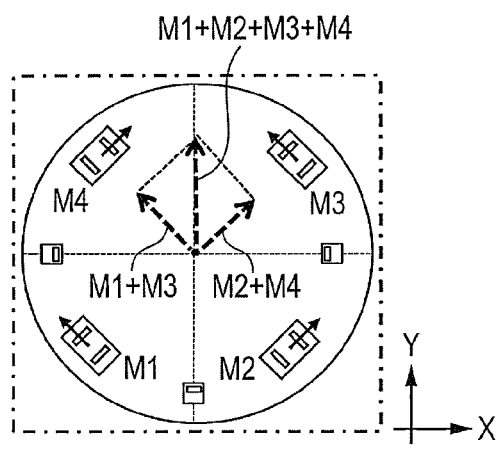
FIG. 7D is a diagram illustrating operations in the X, Y and θ directions of the multi-degree freedom vibration wave driving device.
Figure 7E:
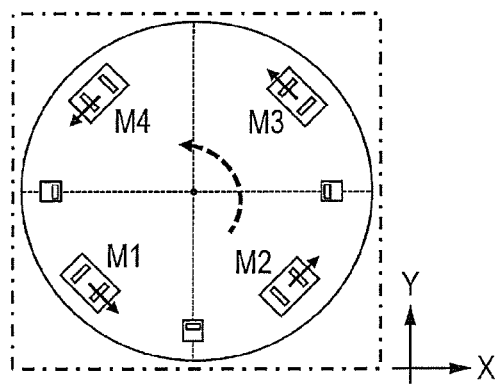
FIG. 7E is a diagram illustrating operations in the X, Y and θ directions of the multi-degree freedom vibration wave driving device.

Likewise, FIG. 7D illustrates driving in the Y direction. FIG. 7E illustrates the case of driving in a counterclockwise direction. In this case, all the driving forces are caused in the same direction.

Application of the action to the vibration isolation mechanism of a camera allows a vibration isolation operation based on an instruction signal from a gyro sensor embedded in the camera, not illustrated.

Figures 8A, 8B:
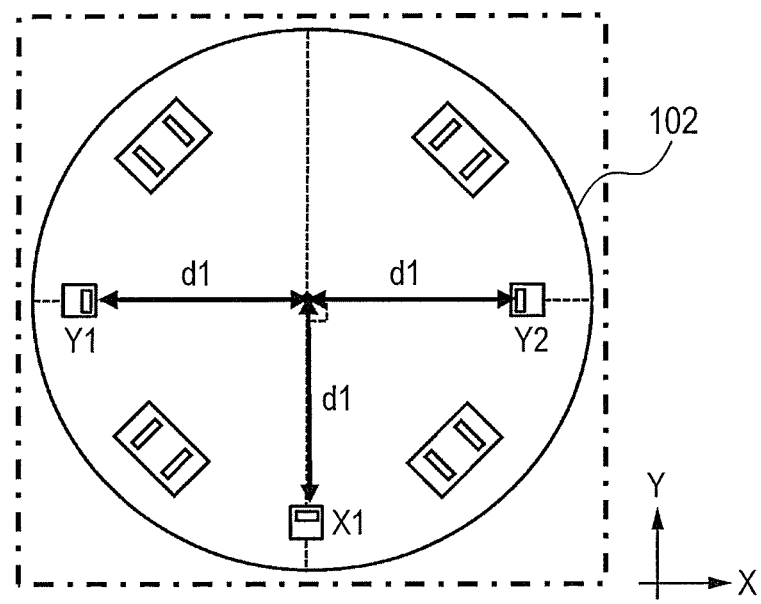
FIG. 8A is a diagram illustrating an expression of coordinate transformation from position sensor signals to X, Y and θ.
FIG. 8B is a diagram illustrating the expression of coordinate transformation from the position sensor signals to X, Y and θ.

FIGS. 8A and 8B illustrate an expression that coordinate-transforms the position sensor signal into X, Y and θ coordinates.

As illustrated in FIG. 8B, the position of the moving body 102 is detected by three position sensors. The distance d1 is from the center point to the position sensor.

The position information at each sensor position, which is regarded as X1, Y1 and Y2, is subjected to an operation process. The X1, Y1 and Y2 position information is coordinate-transformed into X, Y and θ position information by an expression illustrated in FIG. 8A.

The concept of coordinate transformation performs operation using X1 and rotation angle in the X direction, an average value between Y1 and Y2 in the Y direction, and the difference between Y1 and Y2 in the θ direction.

FIGS. 9A and 9B are flowcharts illustrating the learning operation mode in this embodiment.

FIG. 9A illustrates procedures of three learning steps and updating of compensation gains for compensating individual differences.

FIG. 9B illustrates the content of an operation in each learning step.

First, description will be made using FIG. 9A.

When the learning operation mode is instructed by a controller, not illustrated, a learning step 1 is executed (S1).

In the learning step 1, the characteristic difference between the vibrating motors M1 and M3 is detected, and a compensation gain G1 is calculated.

The compensation gain G1 as a parameter is updated by the gain compensator (S2).

Next, a learning step 2 is executed (S3).

In the learning step 2, the characteristic difference between the vibrating motors M2 and M4 having drive axes orthogonal to the drive axes of the vibrating motors M1 and M3 is detected, and a compensation gain G2 is calculated. The compensation gain G2 as a parameter is updated by the gain compensator (S4). Here, the case where the drive axes of the vibrating motors M1 and M2 are orthogonal to the drive axes of the vibrating motors M2 and M4 is described. However, the present invention is not limited thereto. For instance, the drive axes of the vibrating motors M1 and M2 can intersect with the drive axes of the vibrating motors M2 and M4.

Finally, a learning step 3 is executed (S5). In the learning step 3, a characteristic difference between synthetic driving forces (M1+M3) and (M2+M4) is detected, and a compensation gain G3 is calculated. The compensation gain G3 as a parameter is updated by the gain compensator (S6).

The learning operation mode is thus finished, and the mode transitions to the normal operation mode.

Next, description on FIG. 9B will be described.

When the learning step is started, an operation pattern for learning is set by the controller, not illustrated (S7). For instance, a continuous sine wave having any frequency is set.

Next, an X gain, a Y gain and a θ gain arranged in preceding stages of respective PID compensators in the X, Y and θ directions are set.

As the gains, different values are set based on the learning steps 1 to 3 (S8).

After the setting, based on the instruction of the learning operation pattern, driving is started (S9).

After a set time has elapsed, driving is stopped (S10).

Here, X, Y and θ values detected during driving are computed according to an after-mentioned method, thereby calculating compensation gains for compensating the characteristic differences (S11). The learning step is thus finished.

Next, each of the three learning steps according to the learning steps 1, 2 and 3 will be described in detail.

First, the learning step 1 is described.

Figure 10A:
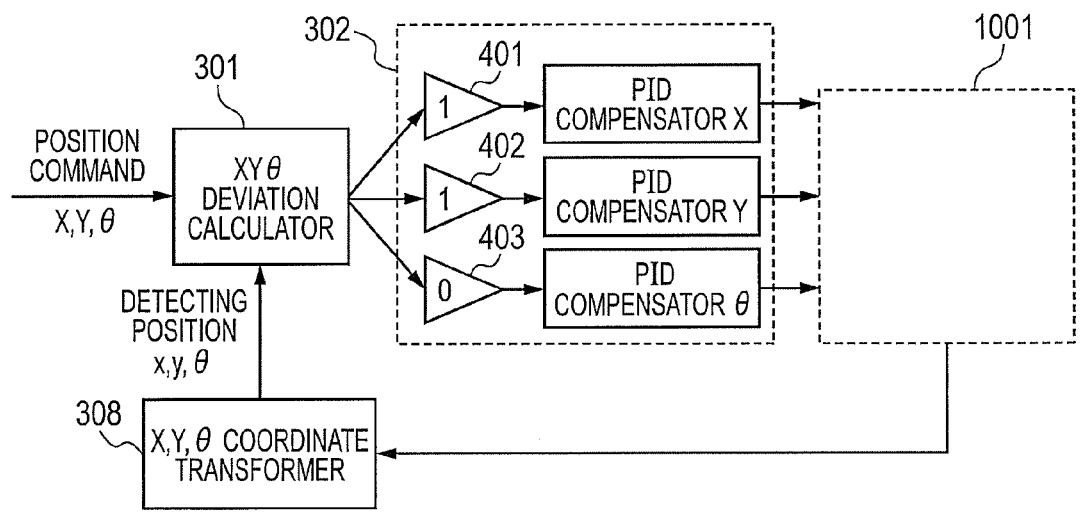
FIG. 10A is a diagram illustrating gain setting, operation patterns, and detected signals of X, Y and θ in preceding stages of PID compensators in a learning step 1.
Figure 10B:
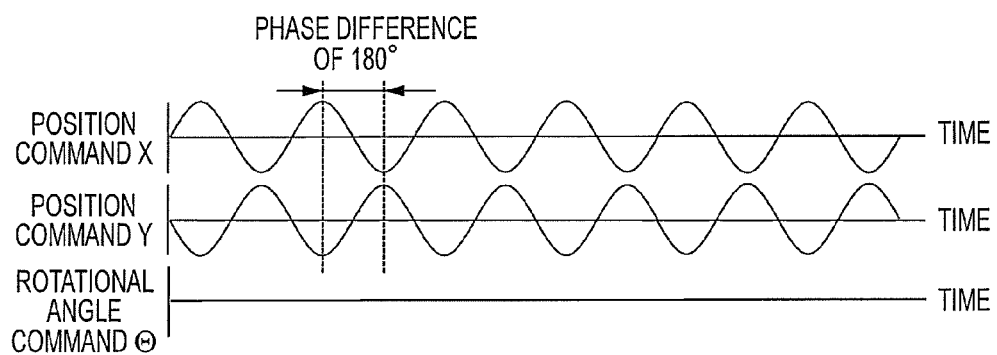
FIG. 10B is a diagram illustrating the gain setting, operation patterns, and detected signals of X, Y and θ in the preceding stages of PID compensators in the learning step 1.
Figure 10C:
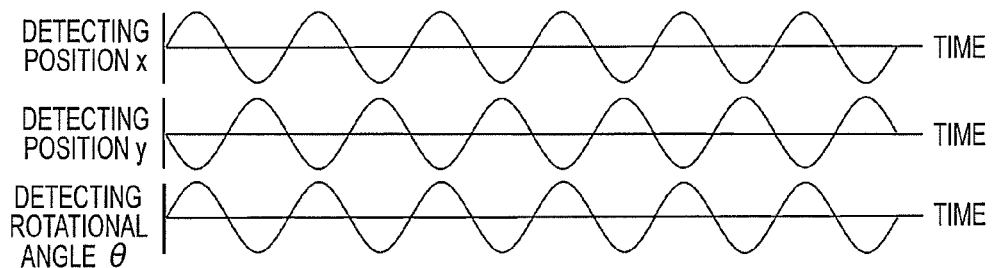
FIG. 10C is a diagram illustrating the gain setting, operation patterns, and detected signals of X, Y and θ in the preceding stages of PID compensators in the learning step 1.

FIGS. 10A to 10C illustrate gain setting, an operation pattern, and detected signals in the preceding stages of the X, Y and θ PID compensators in the learning step 1.

FIG. 10A illustrates setting values of an X gain 401, a Y gain 402 and a θ gain 403 in the PID compensator 302, and a control loop.

The XYθ deviation calculator 301 outputs deviations in the respective directions based on the position command and the detecting position.

The deviations in the respective directions are input into the PID compensator 302, and subjected to the operation process. Here, for instance, the X gain 401 is set to 1, the Y gain 402 is set to 1, and the θ gain 403 is set to 0. The setting represents open control only on a specific G direction.

Even if the θ gain 403 is set to a value sufficiently smaller than the value in the normal operation mode, analogous advantageous effects can be exerted.

A block 1001 includes the controlled amount calculating unit 303 to the position detector 307 in FIG. 3.

FIG. 10B illustrates the X, Y and θ position commands.

X and Y represent sine waveforms having a phase difference of 180°, and θ is zero. Thus, the instruction is for allowing the vibrators M1 and M3 to generate driving forces and for a reciprocating action in a direction slantingly inclined by −45° with respect to the XY axes without rotation.

The position command used for the learning step is not limited to a sine wave. Instead, the waveform may be any of rectangular and triangular waves that are periodical.

Figure 11A:
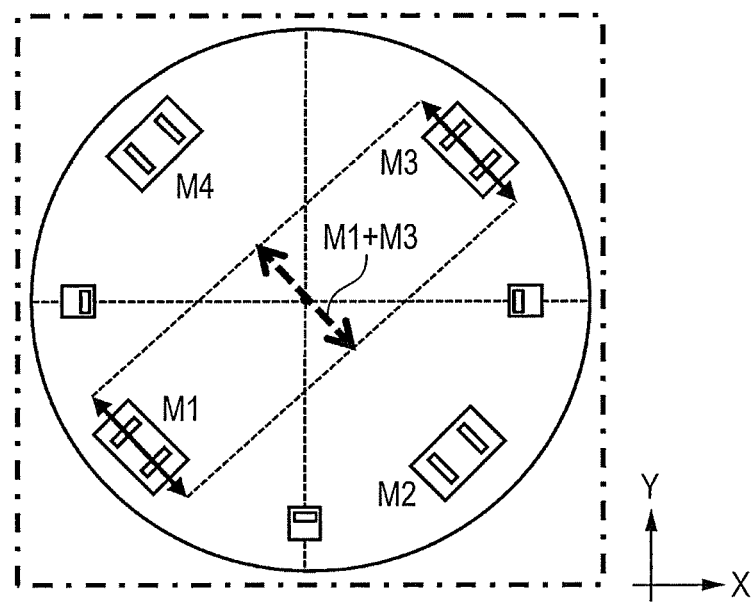
FIG. 11A is a diagram illustrating operations of the multi-degree freedom vibration wave driving device in the learning step 1.
Figure 11B:
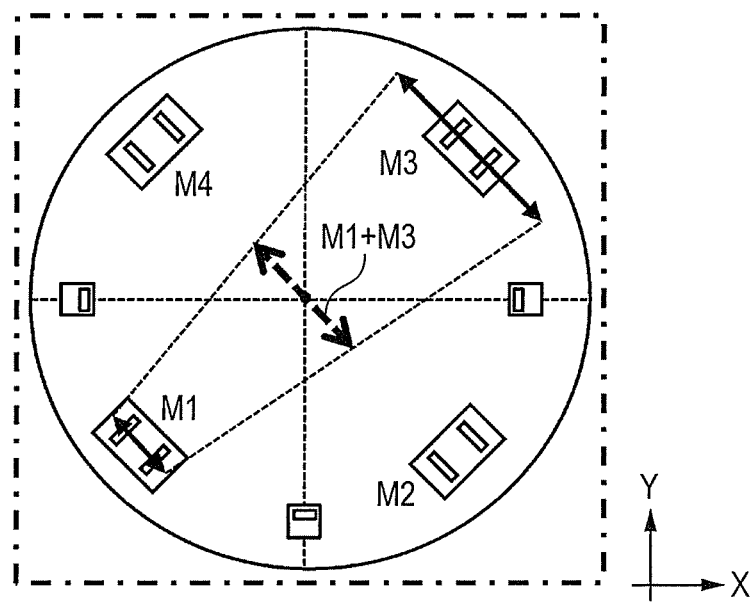
FIG. 11B is a diagram illustrating operations of the multi-degree freedom vibration wave driving device in the learning step 1.

FIGS. 11A and 11B illustrate operations of the multi-degree freedom vibration wave driving device in the learning step 1.

FIG. 11A illustrates the case where the driving forces of the vibrators M1 and M3 ideally match with each other. In this case, a reciprocating action occurs in a direction slantingly inclined by −45° with respect to the XY axes. Even if the θ direction is subjected to open control, no rotational power occurs and an operation is performed according to the instruction value.

FIG. 11B represents the case where the driving forces of the vibrators M1 and M3 are different from each other. As illustrated, in the case where the vibrator M3 has a larger driving force, a reciprocating action occurs while the moving body rotates on the center position as the axis.

More specifically, in the case of an action in an upper left direction, the object rotates in the plus direction. In the case of an action in a lower right direction, the object rotates in the minus direction.

That is, the difference between the driving forces of M1 and M3 represents occurrence of a rotational power due to open control on the θ direction.

FIG. 10C illustrates the X, Y and θ detected values calculated by the XYθ coordinate transformer 308. If the driving forces of the motors M1 and M3 differ from, each other, the difference occurs in θ as the amplitude of a sine waveform. Thus, the detection of the amplitude of the detected rotation angle θ can detect the characteristic difference.

Figure 12A:
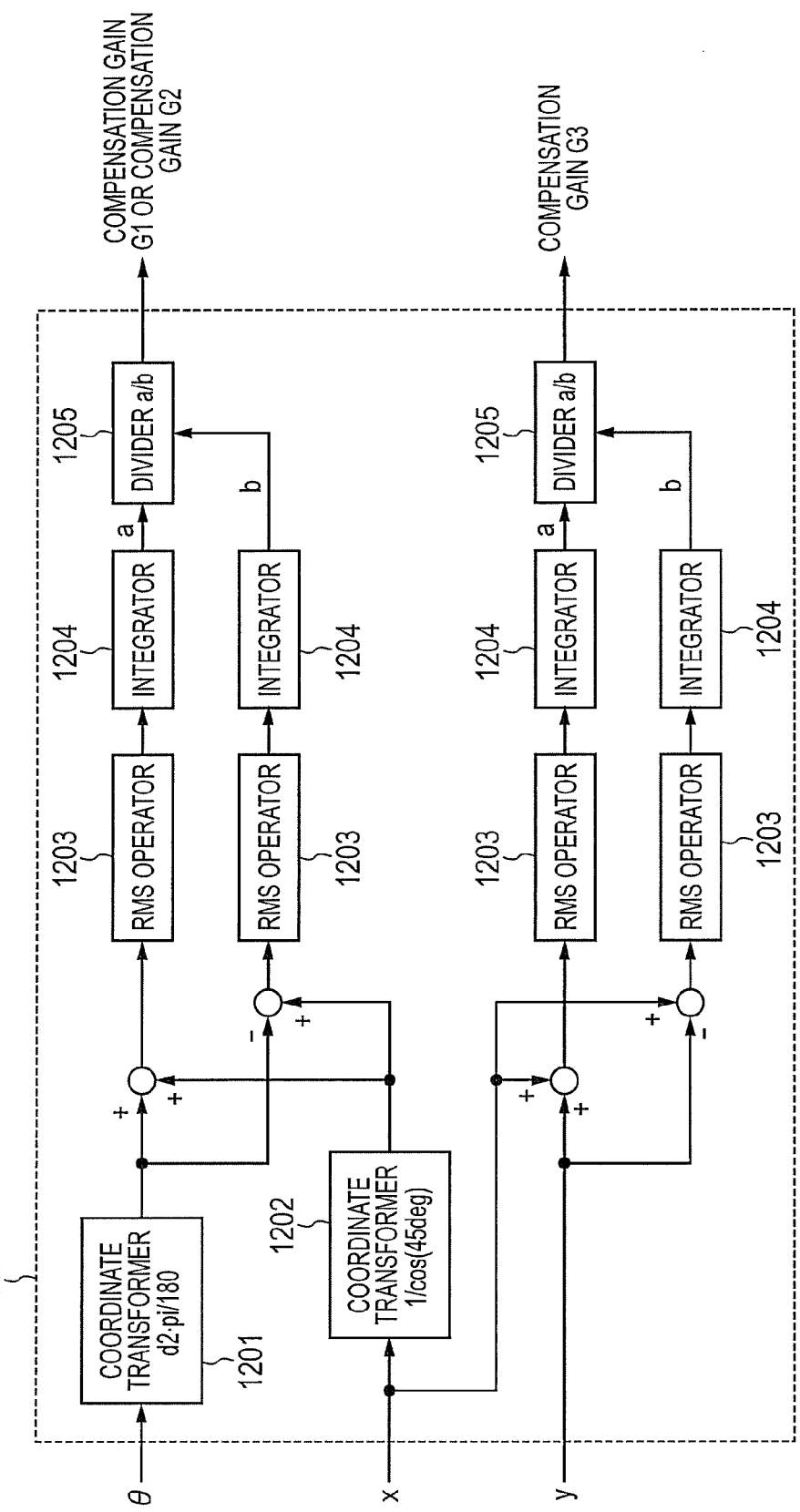
FIG. 12A is a diagram illustrating a configuration of a characteristic difference calculating unit.
Figure 12B:
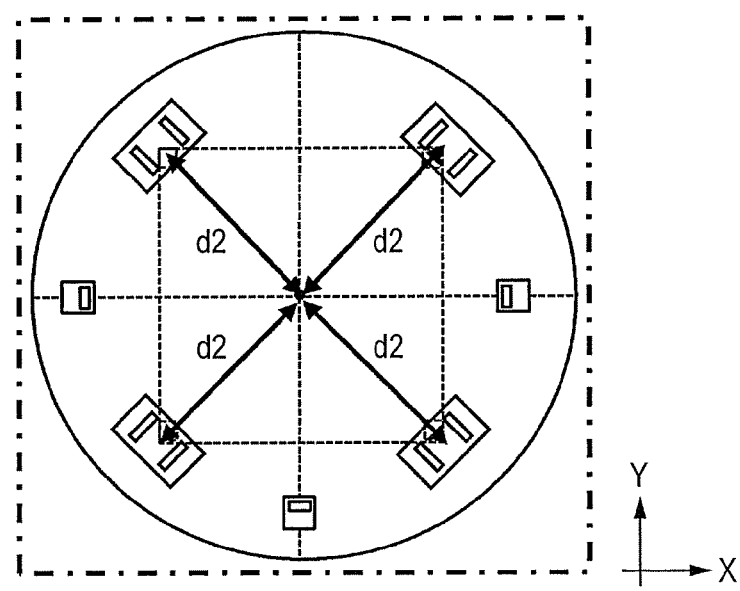
FIG. 12B is a diagram illustrating the configuration of the characteristic difference calculating unit.

FIGS. 12A and 12B illustrate the configuration of the characteristic difference calculating unit in this embodiment.

The characteristic difference calculating unit 502 illustrated in FIG. 5 receives the X, Y and θ detected values as inputs, and calculates the compensation gains G1, G2 and G3 in the learning steps 1 to 3.

The case of calculating the compensation gain G1 in the learning step 1 will be described. The detected rotation angle θ is input into a coordinate transformer 1201, and the input is multiplied by (d2·PI/180).

Here, as illustrated in FIG. 12B, a distance d2 is from the center of the four vibrators to each vibrator. The detected rotation angle θ is converted by the calculation into a movement amount in the tangential direction of a circle having a radius d2.

Meanwhile, the detecting position X is input into a coordinate transformer 1202, and the input is multiplied by (1/COS (45°)). This calculation also converts the movement amount in the X direction into a driving force in the tangential direction of a circle having a radius d2.

A value acquired by adding θ to the converted X corresponds to the movement amount of the vibrator M3; subtraction by θ corresponds to the movement amount of the vibrator M1. That is, calculation of the ratio therebetween can calculate the compensation gain G1 for compensating the characteristic difference.

More specifically, an RMS operator 1203 and an integrator 1204 apply a continuous root mean square process to the movement amount during the reciprocating action. A divider 1205 calculates the ratio of the movement amount of the vibrators M1 and M3.

Figure 13:
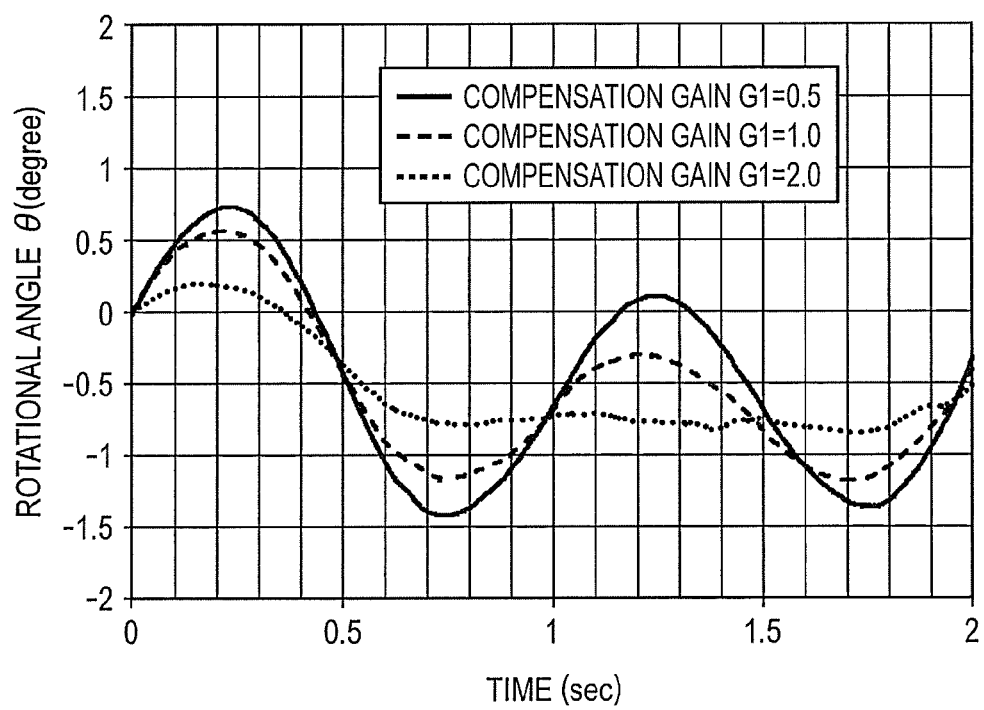
FIG. 13 is a diagram illustrating variation in detected rotation angle θ in the case of changing a compensation gain G1 in the learning step 1.

FIG. 13 illustrates variation in detected rotation angle θ in the case of changing the compensation gain G1 in the learning step 1.

The abscissa indicates time. The ordinate indicates the detected rotation angle θ. In the diagram, the compensation gain G1 is for adjusting the magnitude of the controlled amount for the vibrator M1.

Here, according to vibrators used for an experiment, the driving force of the vibrator M1 is ½ of the driving force of the vibrator M3. Here, with variation in ½ of, the same magnification as, and 2-fold of the compensation gain G1, variation in detected rotation angle θ was measured.

The strokes of the position command X and the position command Y have opposite phases with ±0.5 mm, and a reciprocating action of sine waveform at a frequency of 1 Hz was performed.

As illustrated, in the case of the ½-fold compensation gain G1, the detected rotation angle θ increases. In contrast, in the case of the 2-fold compensation gain G1, the detected rotation angle θ decreases. That is, in the case of the 2-fold compensation gain G1, the characteristic difference between the vibrators M1 and M3 can be compensated.

Figure 14:
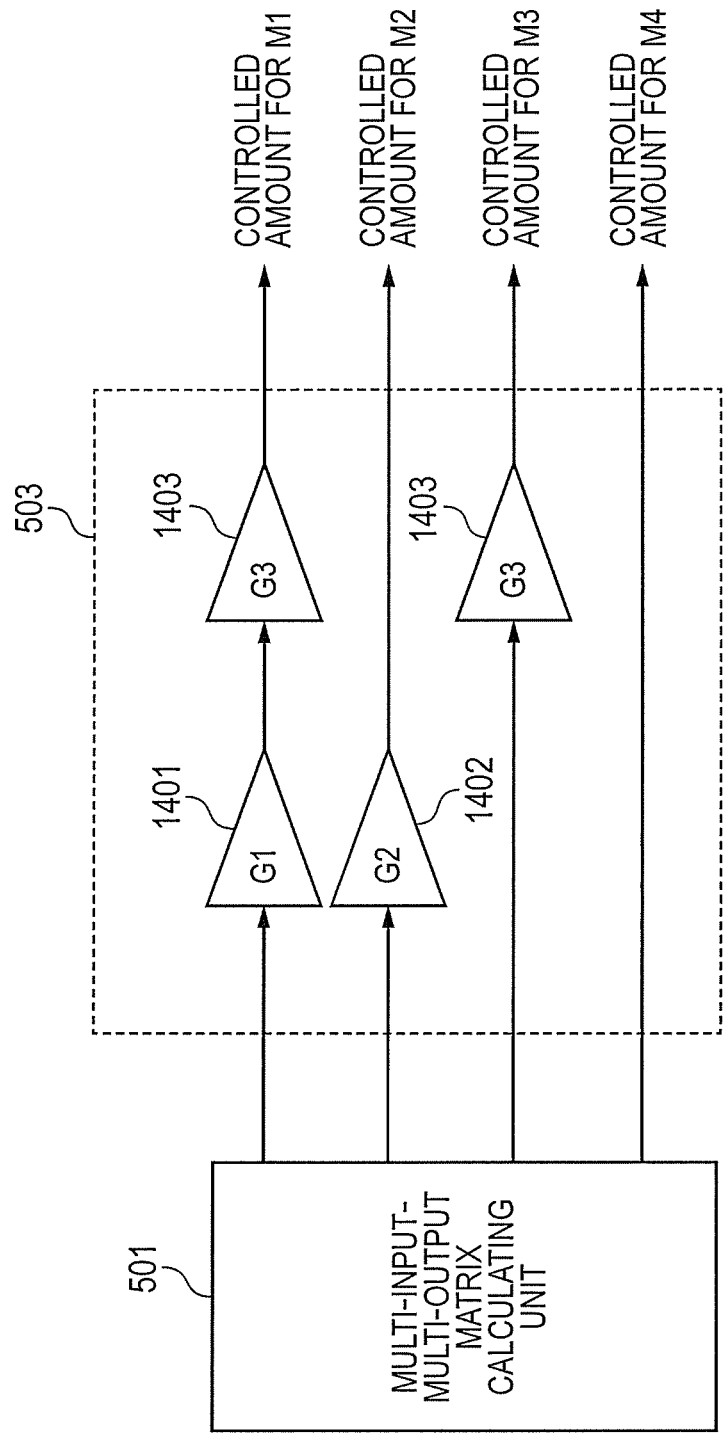
FIG. 14 illustrates a configuration of a gain compensator.

FIG. 14 illustrates the configuration, of the gain Compensator.

The four controlled amount output from, the multi-input multi-output operator 501 in FIG. 5 are input into the gain compensator 503.

The gain compensator 503 compensates the individual differences between the four vibrating motors M1, M2, M3 and M4, and outputs the control amount for the respective motors. In the diagram, the compensation gain G1 (1401) is for compensating the characteristic difference between the vibrators M1 and M3. The compensation gain G2 (1402) is for compensating the characteristic difference between the vibrators M2 and M4. The gain G1 is calculated in the learning step 1. The gain G2 is calculated in the learning step 2.

The compensation gain G3 (1403) is for compensating the characteristic difference between synthetic driving forces (M1+M3) and (M2+M4). The gain G3 is calculated in the learning step 3.

After the learning operation mode is finished, the compensation gains are set in the respective gains G1, G2 and G3 to compensate the individual differences.

Next, the learning step 2 is described.

Figure 15A:
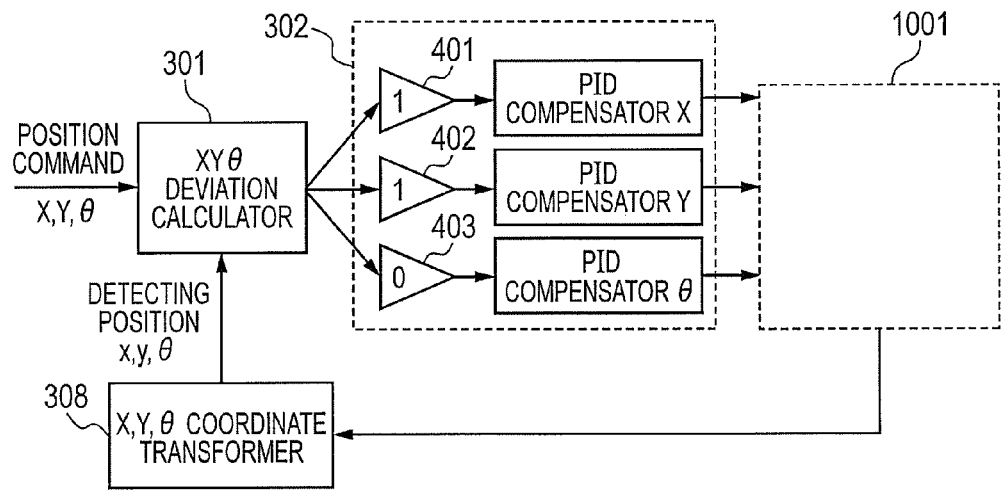
FIG. 15A is a diagram illustrating gain setting, operation patterns, and detected signals of X, Y and θ in preceding stages of PID compensators in a learning step 2.
Figure 15B:
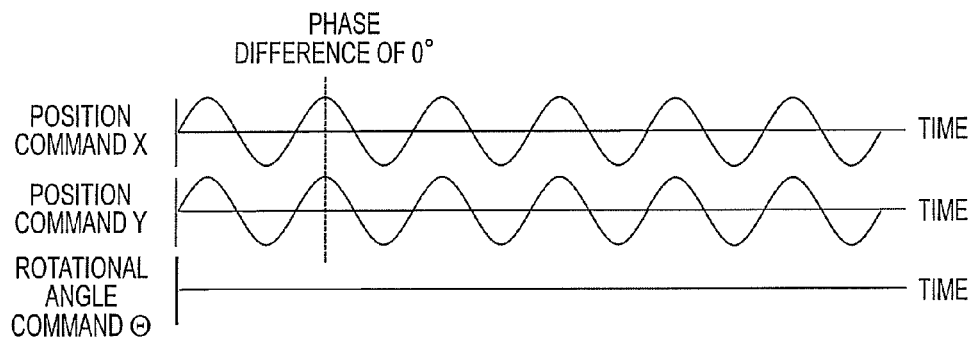
FIG. 15B is a diagram illustrating the gain setting, operation patterns, and detected signals of X, Y and θ in the preceding stages of PID compensators in the learning step 2.
Figure 15C:
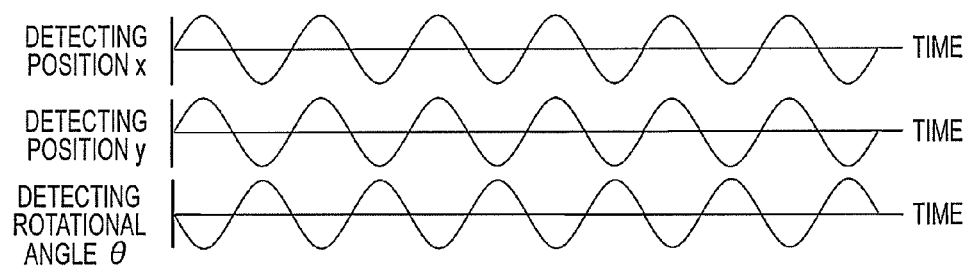
FIG. 15C is a diagram illustrating the gain setting, operation patterns, and detected signals of X, Y and θ in the preceding stages of PID compensators in the learning step 2.

FIGS. 15A to 15C illustrate gain setting, operation patterns, and detected signals in the preceding stages of the X, Y and θ PID compensators in the learning step 2.

FIG. 15A illustrates setting values of an X gain 401, a Y gain 402 and a θ gain 403 in the PID compensator 302, and a control loop.

The XYθ deviation calculator 301 outputs deviations in the respective directions based on the position command and the detecting position. The deviations in the respective directions are input into the PID compensator 302, and subjected to the operation process.

Here, as with the learning step 1, the X gain 401 is set to 1, the Y gain 402 is set to 1, and the θ gain 403 is set to 0, thereby performing open control only on the θ direction.

Also in the case of setting the θ gain 403 to a value sufficiently smaller than the value in the normal operation mode, analogous advantageous effects can be exerted.

The block 1001 includes the controlled amount calculating unit 303 to the position detector 307 in FIG. 3.

FIG. 15B illustrates X, Y and θ position commands, which are different from the instructions in the learning step 1. X and Y represent sine waveforms having a phase difference of 0°, i.e., the same phase; θ is zero. Thus, the instruction is for allowing the vibrators M2 and M4 to generate driving forces and for a reciprocating action in a direction slantingly inclined by +45° with respect to the XY axes without rotation.

Figure 16A:
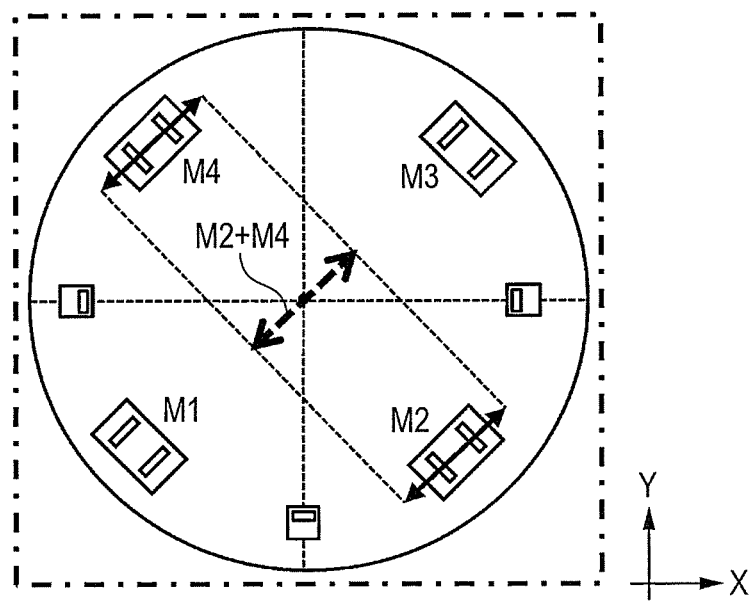
FIG. 16A is a diagram illustrating operations of the multi-degree freedom vibration wave driving device in the learning step 2.
Figure 16B:
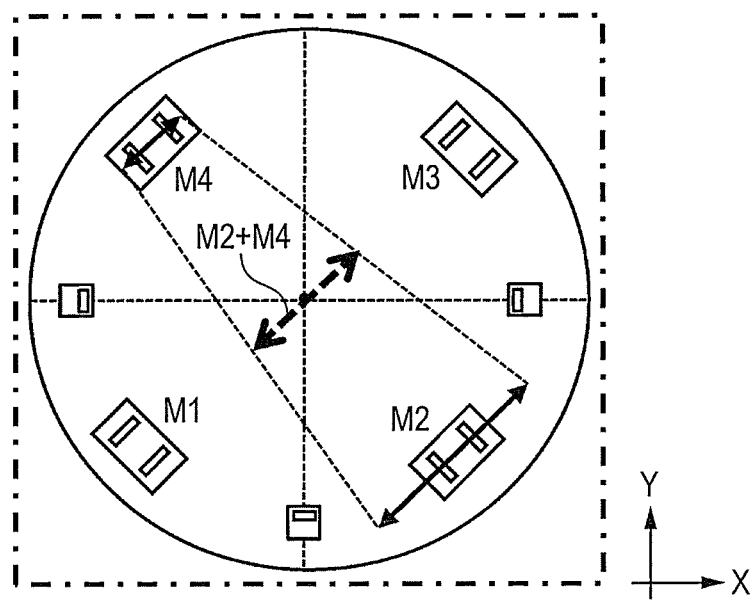
FIG. 16B is a diagram illustrating the operations of the multi-degree freedom vibration wave driving device in the learning step 2.

FIGS. 16A and 16B illustrate operations of the multi-degree-of-freedom drive device in the learning step 2.

FIG. 16A illustrates the case where the driving forces of the vibrators M2 and M4 ideally match with, each other. In this case, a reciprocating action occurs in a direction slantingly inclined by +45° with respect to the XY axes. Even if the θ direction is subjected to open control, no rotational power occurs and an operation, is performed according to the instruction value.

FIG. 16B represents the case where the driving forces of the vibrators M2 and M4 are different from each other. As illustrated, in the case where the vibrator M2 has a larger driving force, a reciprocating action occurs while the moving body rotates on the center position as the axis.

More specifically, in the case of an action in an upper right direction, the object rotates in the plus direction. In the case of an action in the lower left direction, the object rotates in the minus direction. That is, the difference between the driving forces of M2 and M4 represents occurrence of a rotational power due to open control on the θ direction.

FIG. 15C illustrates the X, Y and θ detected values calculated by the XYθ coordinate transformer 308. If the driving forces of the motors M2 and M4 differ from each other, the difference occurs in the detected rotation angle θ as the amplitude of a sine waveform. Thus, the detection of the amplitude of the detected rotation angle θ can detect the characteristic difference.

The compensation gain G2 can be calculated by the characteristic difference calculating unit in FIGS. 12A and 12B described above, according to a method analogous to the learning step 1.

Next, the learning step 3 is described.

Figure 17A:
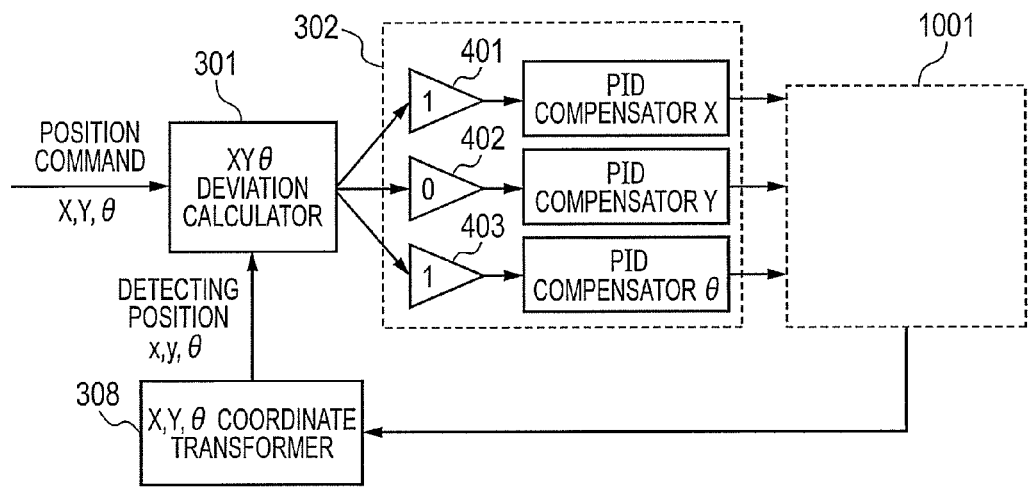
FIG. 17A is a diagram illustrating gain setting, operation patterns, and detected signals of X, Y and θ in preceding stages of PID compensators in a learning step 3.
Figure 17B:
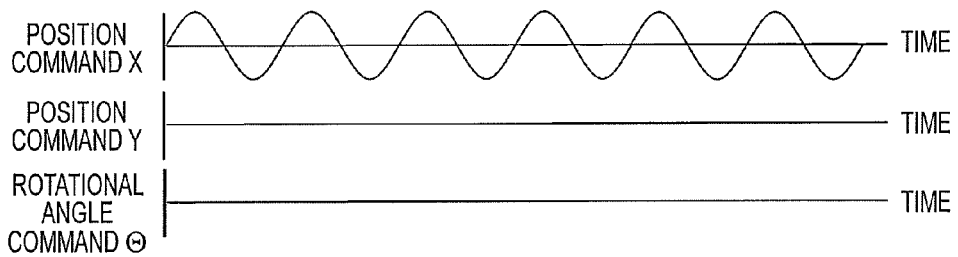
FIG. 17B is a diagram illustrating the gain setting, operation patterns, and detected signals of X, Y and θ in the preceding stages of FID compensators in the learning step 3.
Figure 17C:
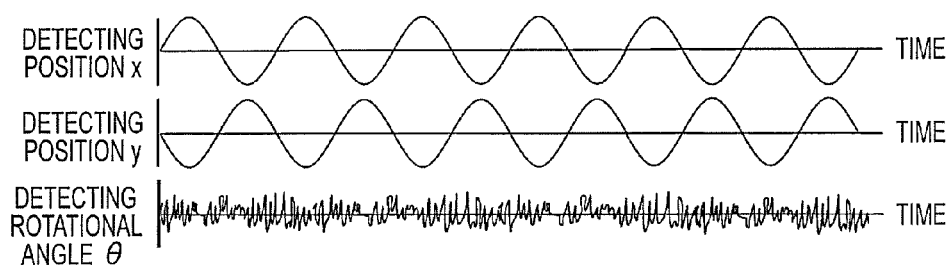
FIG. 17C is a diagram illustrating the gain setting, operation patterns, and detected signals of X, Y and θ in the preceding stages of PID compensators in the learning step 3.

FIGS. 17A to 17C illustrate gain setting, operation patterns, and detected signals in the preceding stages of the X, Y and θ PID compensators in the learning step 3.

FIG. 17A illustrates setting values of an X gain 401, a Y gain 402 and a θ gain 403 in the PID compensator 302, and a control loop.

The XYθ deviation calculator 301 outputs deviations in the respective directions based on the position command and the detecting position.

The deviations in the respective directions are input into the PID compensator 302, and subjected to the operation process. Here, the X gain 401 is set to 1, the Y gain 402 is set to 0, and the θ gain 403 is set to 1, thereby performing open control only on the Y direction.

In the case of setting the Y gain 403 to a value sufficiently smaller than the value in the normal operation mode, analogous advantageous effects can be exerted.

The 1001 includes the controlled amount calculating unit 303 to the position detector 307 in FIG. 3. FIG. 17B illustrates the X, Y and θ position commands.

The position command X is a sine waveform. The position commands Y and θ are zero. Thus, the instruction is for allowing the four vibrators to generate driving forces and for a reciprocating action on the X-axis without rotation.

Figure 18A:
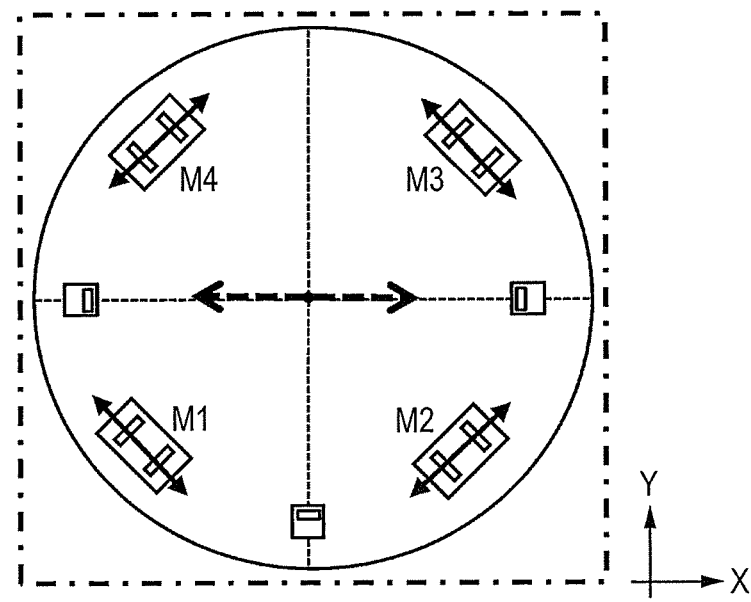
FIG. 18A is a diagram illustrating operations of the multi-degree freedom vibration wave driving device in the learning step 3.
Figure 18B:
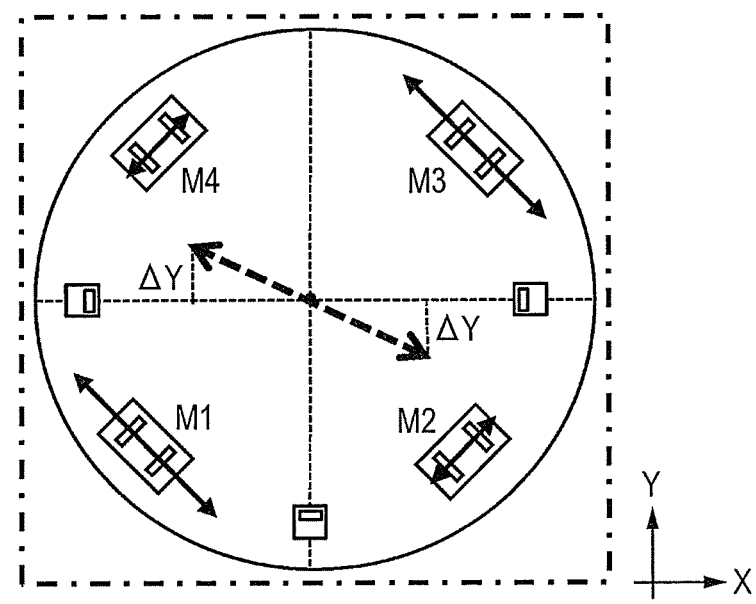
FIG. 18B is a diagram illustrating the operations of the multi-degree freedom vibration wave driving device in the learning step 3.

FIGS. 18A and 18B illustrate operations of the multi-degree-of-freedom drive device in the learning step 3.

FIG. 18A illustrates the case where the driving forces of the vibrators M1, M2, M3 and M4 ideally match with each other. In this case, a reciprocating action occurs on the X-axis, no positional deviation occurs in the Y direction even if the Y direction is subjected to open control, and the object operates according to the instruction value.

FIG. 18B represents the case where driving forces of the synthetic driving forces (M1+M3) and (M2+M4) are different from each other. As illustrated, in the case where the synthetic driving force (M1+M3) is larger, a reciprocating action occurs while a positional deviation occurs in the Y direction.

More specifically, in the case of an action in the right direction, a positional deviation occurs in the minus direction. In the case of an action in the left direction, a positional deviation occurs in the plus direction. That is, the difference between the synthetic driving forces represents occurrence of a positional deviation in the Y direction due to open control on the Y direction.

FIG. 17C illustrates the X, Y and θ detected values calculated by the XYθ coordinate transformer 308. If the synthetic driving forces differ from each other, the difference occurs as the amplitude of the sine waveform at the detecting position Y.

The detected rotation angle θ is rotationally controlled. Accordingly, the angle converges around zero. Thus, the detection of the amplitude on the detecting position Y can detect the characteristic difference.

A method of calculating the compensation gain G3 in the learning step 3 will be described using the characteristic difference calculating unit (FIGS. 12A and 12B) described above. As illustrated, a value acquired by adding the detecting position Y to X corresponds to the movement amount of the synthetic driving force (M2+M4); subtraction by Y corresponds to the movement amount of the synthetic driving force (M1+M3).

Calculation of the ratio therebetween can calculates the compensate gain G3 for compensating the characteristic difference. More specifically, the RMS operator 1203 and the integrator 1204 apply a continuous root mean square process to the movement amount during the reciprocating action. The divider 1205 calculates the ratio of the movement amount.

Figure 19A:
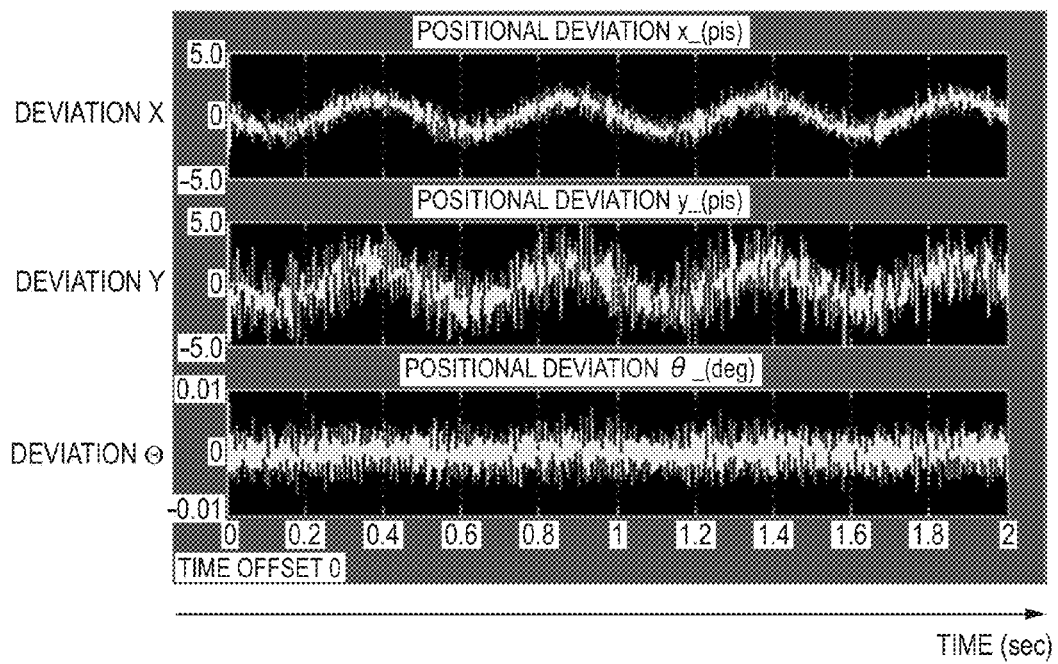
FIG. 19A is a diagram illustrating a simulation result in the case of controlling the multi-degree freedom vibration wave driving device using the compensation gain calculated in the learning step.
Figure 19B:
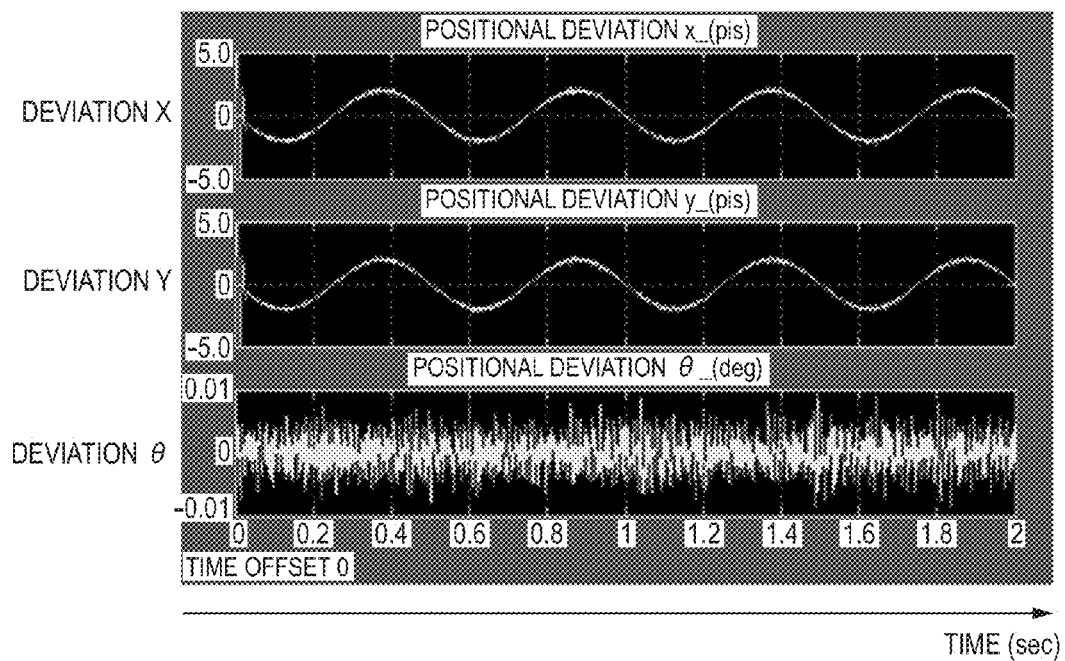
FIG. 19B is a diagram illustrating a simulation result in the case of controlling the multi-degree freedom vibration wave driving device using the compensation gain calculated in the learning step.
Figure 20A:
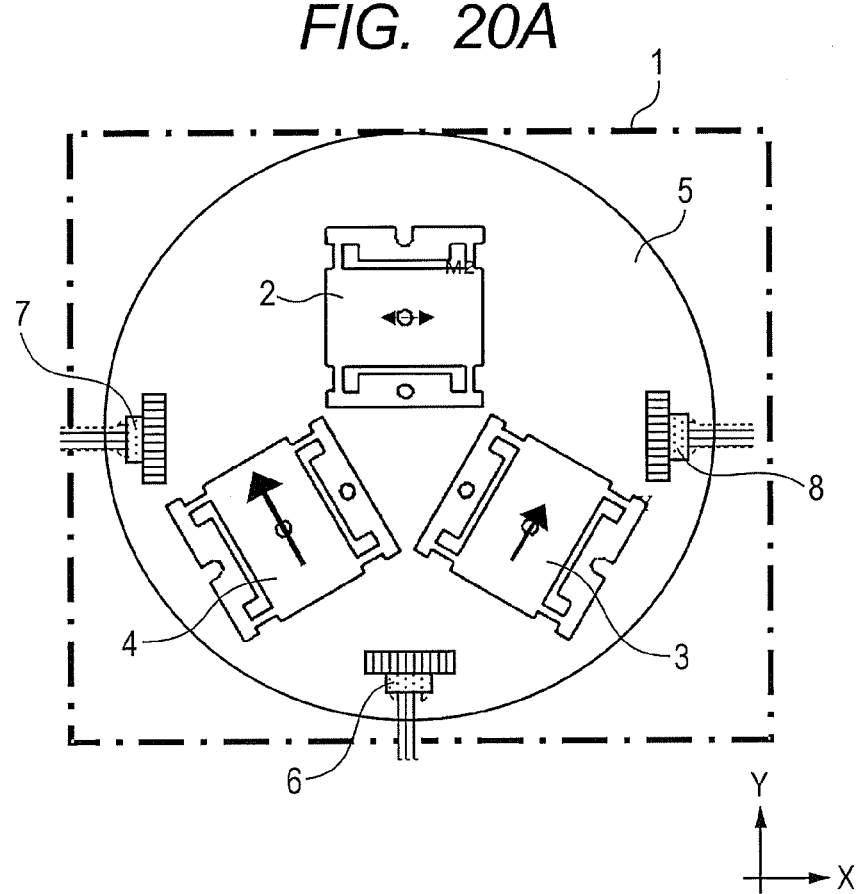
FIG. 20A is a diagram illustrating a configuration of a multi-degree-of-freedom drive device.
Figure 20B:
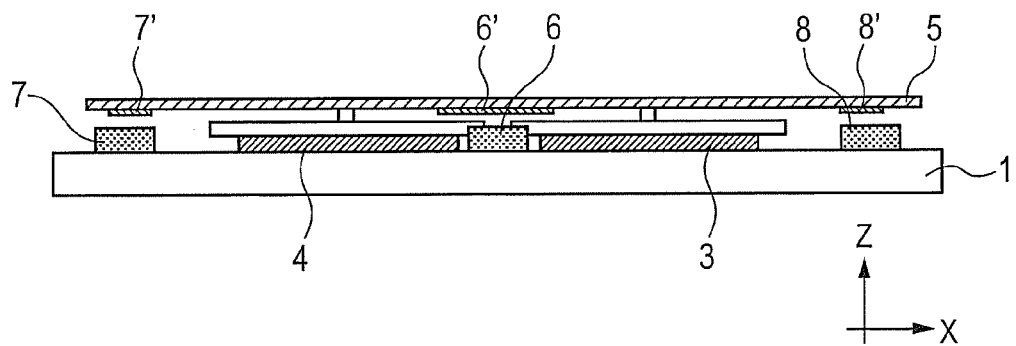
FIG. 20B is a diagram illustrating the configuration of the multi-degree-of-freedom drive device.

FIGS. 19A and 19B illustrate simulation results in the case of controlling the multi-degree freedom vibration wave driving device using the compensation gain calculated in the learning step. The abscissa indicates time. The ordinates indicate the deviation X, deviation Y, and deviation θ.

Here, it is assumed that the four vibrators have individual differences, and the ratios of the driving forces of the vibrators M1, M2, M3 and M4 are set to [0.5, 1.0, 2.0, 0.5].

FIG. 19A illustrates a result in the case of control without compensation. When the learning steps 1 to 3 are executed, the compensation gains G1, G2 and G3 are calculated as [3.912, 0.5067, 0.2546]. FIG. 19B illustrates a result of control where the values are set in the gain compensator. As illustrated, it is confirmed that application of the compensation operation of the present invention improves the control characteristics, and reduces the positional deviation.

Furthermore, the control systems in the respective XYθ directions become stable. Accordingly, the control gains can be increased.

Moreover, the individual differences are isolated according to the drive directions, and detected. Accordingly, the characteristic differences can be accurately extracted. The calculation of the individual differences as ratios allows compensation by setting of the compensation gains, which is a simple method.

The present invention is applicable to driving in the multiple directions using at least two motors. For instance, the present invention is applicable widely to another example of a configuration of driving in the multiple directions using multiple vibrators.

For instance, the configuration may be any of the configuration of driving in the XYθ directions using the three vibrators as described in the conventional art, and the configuration of driving in the X and Y directions using two vibratos.

Use of only one of the learning steps also can exert the advantageous effects of the present invention.

In this embodiment, the example where the difference of transfer characteristics in the X, Y and θ directions are taken into account has been described. However, the present invention is not limited thereto. The present invention is also applicable to the case of driving the moving body only in the two directions, i.e., the first and second directions. The first direction and the second direction are only required to intersect to each other. The directions are not necessarily orthogonal.

The control device of this embodiment achieves cooperative control where the difference in the X, Y and θ directions of the transfer characteristics of the driving forces where the driving forces of the vibrating motors are synthesized is taken into account. This control can improve controllability in the positional deviation and responsiveness, and drive the moving body in the multiple directions.

Embodiment 2

In Embodiment 1, the description has been made using the example of adopting the vibrating motors as the motors. However, the present invention is not limited thereto. Another motor may be adopted.

In this embodiment, description will be made on an example of a configuration that is different only in driving units from the configuration in Embodiment 1, with reference to FIG. 22. In Embodiment 1, the case of the multi-degree-of-freedom drive device that adopts the vibrating motors have been described. The vibrating motor has a configuration where application of a drive signal to an electromechanical energy transducer included in the vibrator excites the vibrator to cause an oval action due to two modes, i.e., first and second bending modes, having substantially orthogonal node lines, and cause a driving force due to friction at a part in contact with the vibrator.

In this embodiment, instead of the vibrating motors, drive units called voice coil motors are adopted. The voice coil motor, which includes a drive coil and a permanent magnet, converts electric energy into mechanical energy using magnetic fluxes caused by the permanent magnet.

Figure 22:
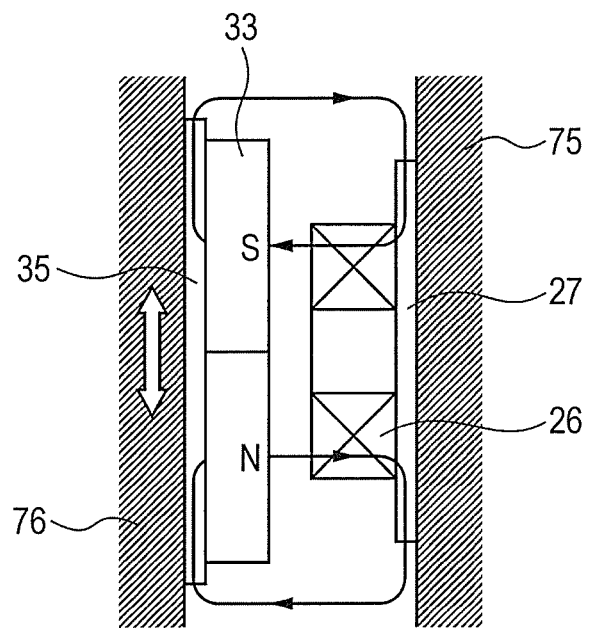
FIG. 22 is a sectional view illustrating an example of a motor.

FIG. 22 is a sectional view of the voice coil motor. In a state in the diagram, the center of a drive coil 26 attached to a fixation section 75 is on the center line of a permanent magnet 33. The magnetic force of the permanent magnet 33 generates magnetic lines represented by arrows in FIG. 22. Accordingly, when current flows through the drive coil 26 to generate a magnetic field from the right to the left in the diagram, a force that moves a movable member 76 downward is generated. When current reversely flows, a force that moves the movable member 76 upward is generated. The diagram also illustrates a back yoke 35 and a suction yoke 27. The back yoke 35 and the suction yoke 27 are arranged such that long sides overlap with each other and short sides overlap with each other.

Figure 23A:
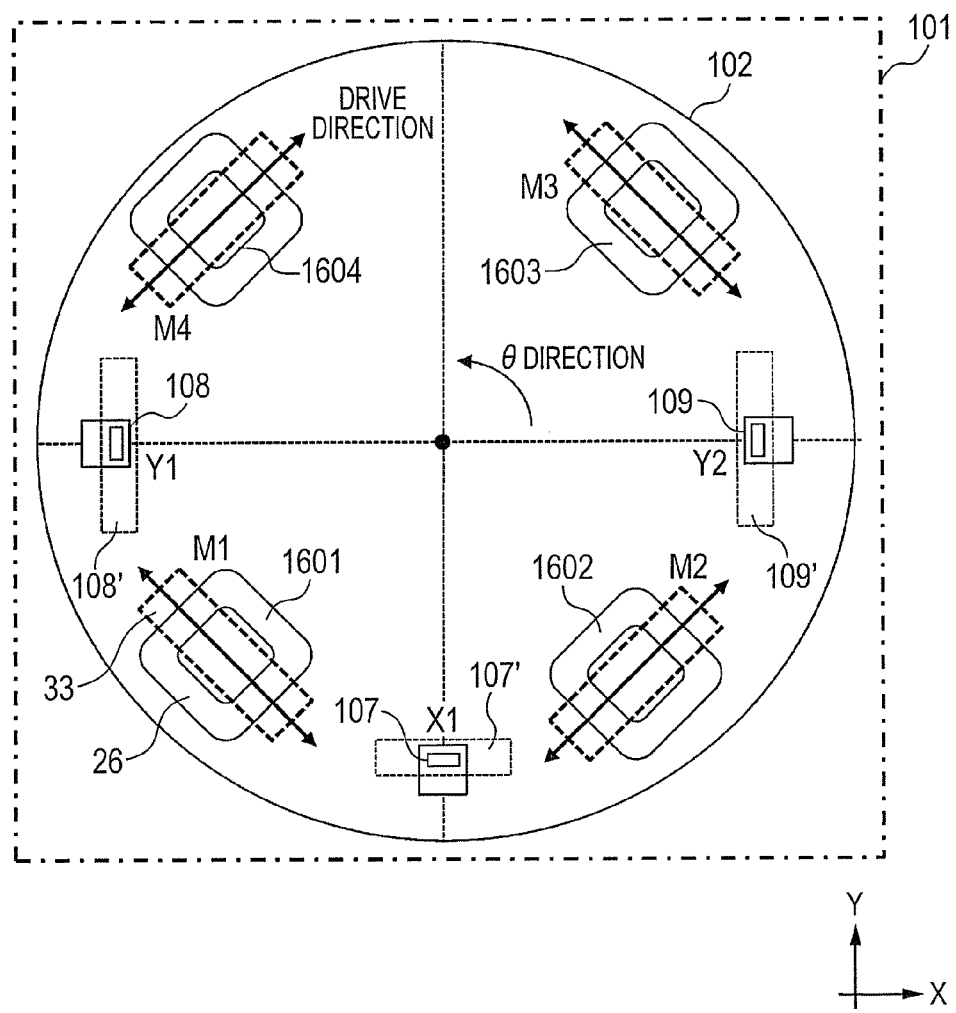
FIG. 23A is a diagram illustrating a configuration of the multi-degree-of-freedom drive device.

FIG. 23A is a diagram illustrating the configuration of the multi-degree-of-freedom drive device that adopts the voice coil motors.

Four voice coil motors 1601, 1602, 1603 and 1604 are provided between the base plate 101 and the moving body 102. The voice coil motors are arranged as with Embodiment 1. The configuration moves the moving body in a direction into which the driving forces of the motors are vector-synthesized.

Figure 23B:
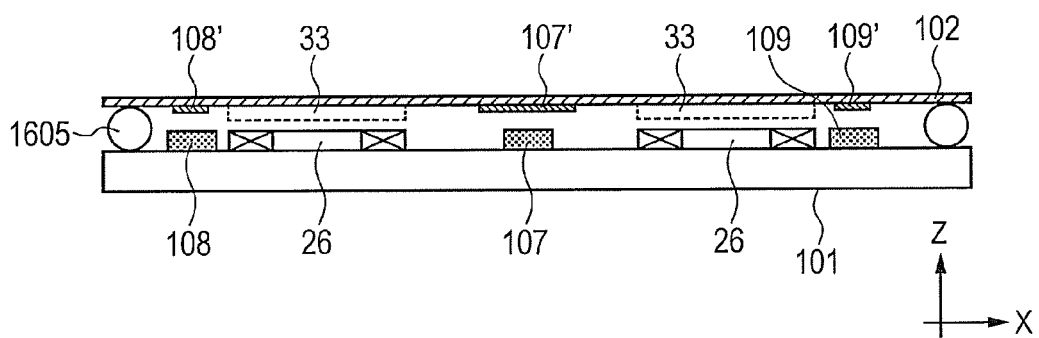
FIG. 23B is a diagram illustrating the configuration of the multi-degree-of-freedom drive device.

FIG. 23B is a side view of the apparatus. A drive coil 26 of each voice coil motor is attached to the base plate 101. The permanent magnet 33 is attached to the moving body 102. The moving body 102 is supported by steel balls 1605. The steel ball 1605 smoothly roll between the base plate 101 and the moving body 102, thereby allowing the moving body 102 to move translationally and rotationally in a plane perpendicular to the optical axis.

A control system analogous to the system of Embodiment 1 in FIG. 3 can also be applied to the multi-degree-of-freedom drive device of this embodiment, thereby achieving driving. In this embodiment, the voice coil motors are adopted as the drive units. Accordingly, the drive parameter output from the controlled amount calculating unit 303 can be used as the pulse width. In Embodiment 1, the drive parameters of the vibrating motors are information on the frequency, phase difference and pulse width. Since the driving forces of the voice coil motors of this embodiment are controlled by current flowing through drive coils, the PWM (pulse width modulation) control can change the pulse width according to the control parameter. Thus, the control device of the present invention is also applicable to the multi-degree-of-freedom drive device that adopts the voice coil motors as the drive units.

The present invention is not limited to the configuration described in this embodiment. The present invention is applicable widely to any type of driving in multiple directions using multiple voice coil motors.

For instance, the present invention is applicable to the configuration adopting three voice coil motors for driving in the XYθ directions, which is described as the conventional art, and to a configuration adopting two voice coil motors for driving in the X and Y directions.

In this embodiment, the example has been described where the differences in transfer characteristics of the X, Y and θ directions are taken into account. However, the present invention is not limited thereto. The present invention is also applicable to the case of driving the moving body only in two directions, which is a first direction and a second direction. The first direction and the second direction may be any of directions that intersect with each other. The directions are not necessarily orthogonal to each other.

The control device of this embodiment achieves the cooperative control where the difference of the transfer characteristics of the driving forces where the driving forces of the vibrating motors are synthesized, in the X, X and θ direction is taken into account. The control can improve controllability of the positional deviation and responsiveness, and drive the moving body in the multiple directions.

As with Embodiment 1, this embodiment also includes: the controller that outputs the control signal in the normal operation mode at the predetermined gain, and the control signal in the learning operation mode where the gain is adjusted to calculate the characteristic differences of the respective motors; the controlled amount calculating unit 303 that receives the control signal from the controller and outputs the drive parameters for the respective motors by operation. The controller and the operator are arranged in the path of the control system for feedback control on the position command. In the learning step analogous to the step in Embodiment 1, the characteristic differences of the respective motors are calculated, thereby allowing the controlled amount to be corrected.

Embodiment 3

An example will be described where the motor control device of the present invention is applied to an image pickup apparatus (optical apparatus), such as a camera. Here, an example is described where vibrating motors for driving a lens and autofocusing are integrated in a lens barrel of an image pickup apparatus with reference to FIG. 24.

Figure 24:
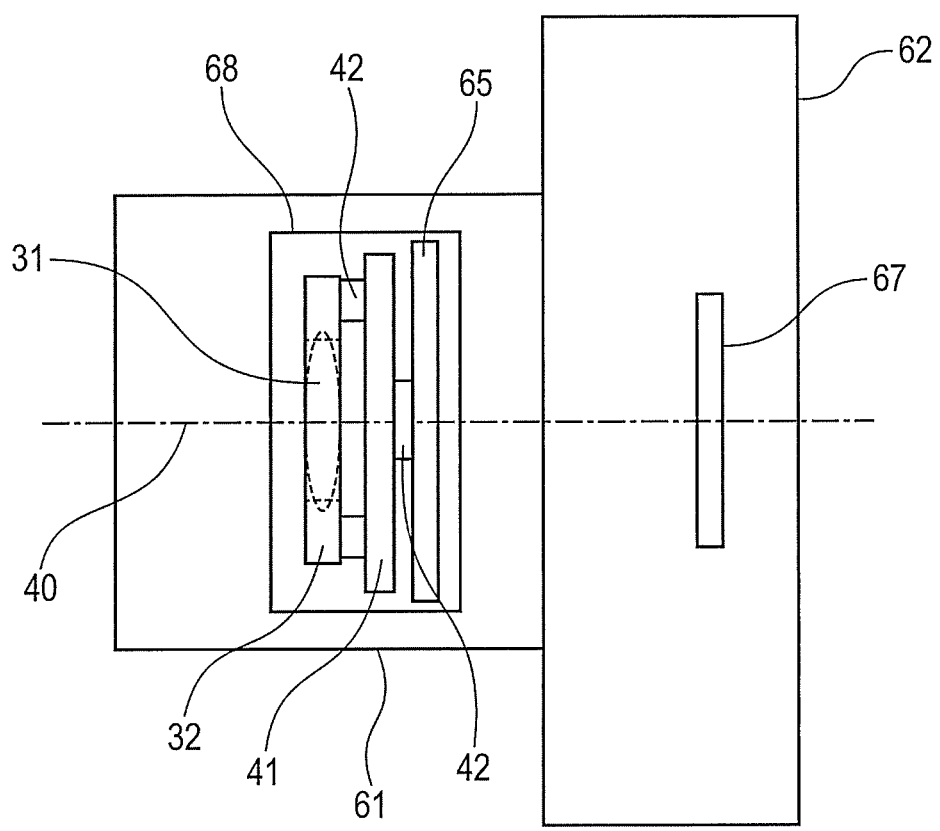
FIG. 24 is a diagram illustrating an example of application of a motor control device.

FIG. 24 is a sectional view of the camera as the image pickup apparatus for allowing a correction lens to correct image fluctuation. The camera in FIG. 24 has a function of taking moving images and still images. The diagram illustrates the lens barrel 61 and a camera body 62. The diagram also illustrates a correction optical device 68 embedded in the lens barrel 61. The correction optical device 68 of this embodiment includes: a correction lens 31; a movable plate (movable member) 32 that holds the correction lens 31. Drive devices 42 provided at a rotation ring 65 and a slide plate 41 translationally move the movable plate 32 in a plane perpendicular to the optical axis 40 of the correction optical device.

Although not illustrated in FIG. 24, the lens barrel 61 is provided with an optical system, other than the correction lens 31, an acceleration sensor that detects the fluctuation of the lens barrel 61, and an encoder that detects the two-dimensional movement of the movable plate 32. Furthermore, a power source that supplies the drive device with electric energy, and a controller that processes a signal of the acceleration sensor and a signal of the encoder and operates the power source are provided.

An image pickup element 67 is provided in a camera body 62. Light from a subject passes through an optical system including the correction lens 31 in the lens barrel 61, and enters the image pickup element 67 in the camera body 62. The configuration allows the correction optical device 68 to move the correction lens 31 based on the signal of the acceleration sensor and to correct the fluctuation of an image.

In this embodiment, the example of the image pickup apparatus has been described that includes a correction optical device for correcting the fluctuation of an image by moving the lens by the vibrating motors. However, application of the present invention are not limited thereto. For instance, the present invention is also applicable to an image pickup apparatus including a correction optical device that allows the motors, such as vibrating motors, to move the image pickup element and correct fluctuation of an image.

FIG. 24 illustrates the example where the vibration type driving device of the present invention is applied to the image pickup apparatus. However, application is not limited thereto. The present invention is also applicable to driving of various stages, such as of microscopes. For instance, an example where the present invention is applied to driving of a stage of a microscope will be described with reference to FIG. 25.

Figure 25:
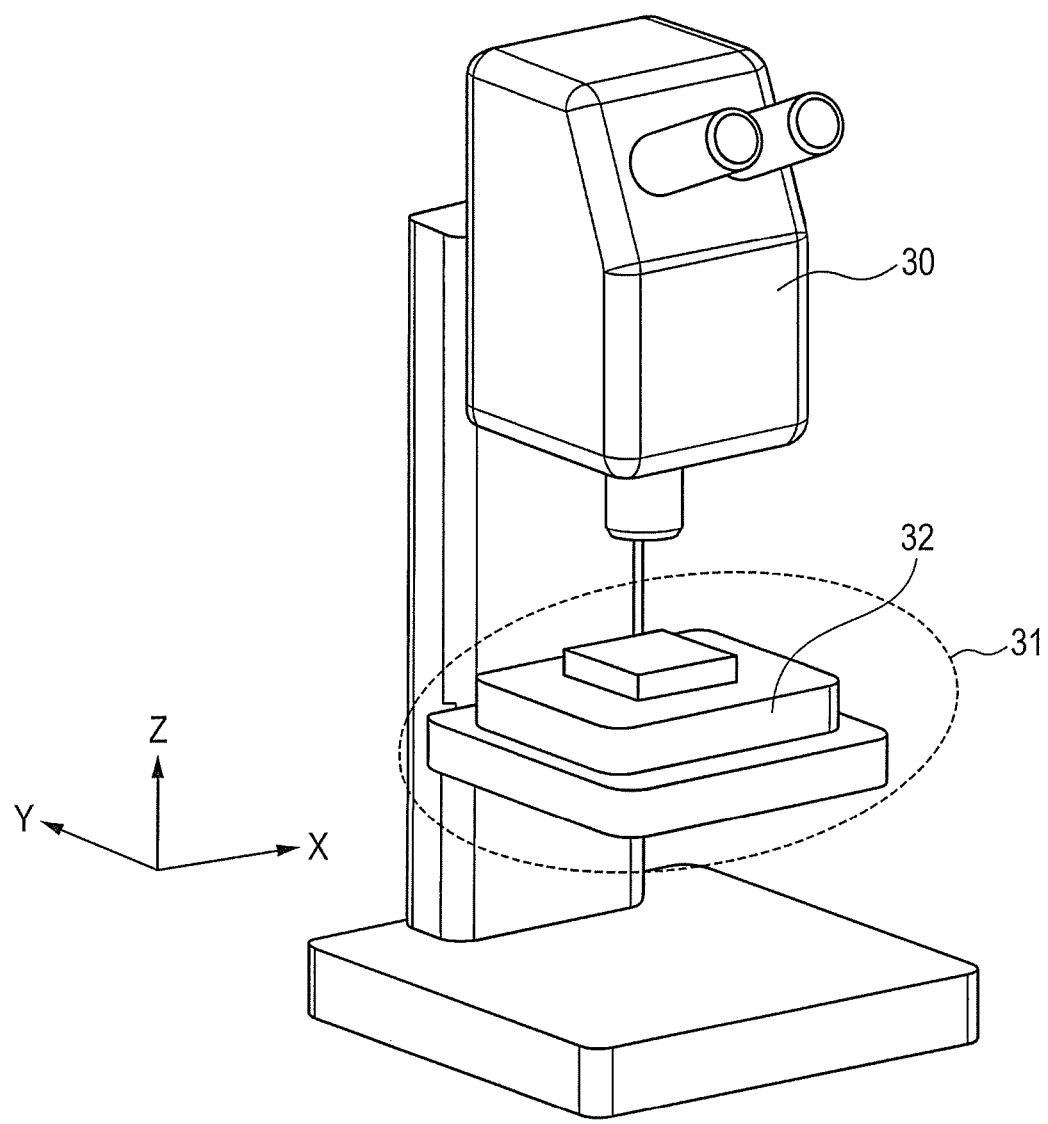
FIG. 25 is a diagram illustrating an example of application of a motor control device.

FIG. 25 is a perspective view of a microscope to which a motor control device of the present invention is applied. The microscope in FIG. 25 includes: an image pickup unit 30 embedded with an image pickup element and an optical system; and an automatic stage 31 including a stage 32 that is provided on a base and moved by a vibration type driving device. An observation object is placed, on the stage 32, and an enlarged image is taken by the image pickup unit 30. In the case where an observation range covers a wide area, the vibration type driving device moves the stage 32 to move the observation object in an X direction and a Y direction in the diagram and takes various images. The taken images are combined by a computer, not illustrated, to allow a high-resolution image with a wide observation range to be taken.

In this embodiment, with reference to FIGS. 24 and 25, the examples of adopting the vibrating motors as the motors has been described. However, the configuration is applicable to the cases adopting another type of motors, such as voice coil motors.

In yet another aspect of the present invention, the vibration type driving device is configured that vector-synthesizes the driving forces of the multiple vibrators to allow driving in the multiple directions. In this configuration, the vibration type driving device can be achieved that can detect and compensate the individual differences of the driving forces of the respective vibrators according to the learning operation to thereby improve controllability of the positional deviation and responsiveness, and move the moving body in the multiple directions. Furthermore, the image blur correction device that includes the vibration type driving device can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-198652, filed Sep. 10, 2012, and Japanese Patent Application No. 2013-176549, filed Aug. 28, 2013, which are hereby incorporated by reference herein in their entirety.

What is claimed is:

1. A control device, comprising:
a controller configured to output a first control signal pertaining to a first direction and a second control signal pertaining to a second direction crossing the first direction based on predetermined gains in a normal operation mode, and to output a third control signal and a fourth control signal based on gains set with respect to the first direction and the second direction, respectively, in a learning operation mode; and
a controlled amount calculating unit configured to receive the first control signal, the second control signal, the third control signal and the fourth control signal, and to output a fifth control signal and a sixth control signal pertaining to drive parameters with respect to at least a first motor and a second motor, respectively, the first motor and the second motor being configured to drive a moving body,
wherein the controlled amount calculating unit comprises:
a characteristic difference calculating unit configured to calculate characteristic differences between at least the first motor and the second motor based on the third control signal and the fourth control signal; and
a gain compensator configured to adjust a controlled amount pertaining to drive parameters of at least the first motor and the second motor according to the calculated characteristic differences of at least the first motor and the second motor, and to output the fifth control signal and the sixth control signal.

2. The control device according to claim 1,
wherein at least the two motors drive the moving body in the first direction, and
wherein the characteristic difference calculating unit is configured to calculate the characteristic differences between at least the first motor and the second motor in the learning operation mode based on a detected value based on a difference between driving forces in driving the first motor and the second motor with a control gain in the first direction smaller than a control gain in the second direction or with a control gain smaller than a control gain in the normal operation mode.

3. The control device according to claim 1,
wherein the controlled amount calculating unit is provided in a path of a control system that performs feedback control on a position command.

4. The control device according to claim 1,
wherein the controller is an operator configured to compensate a phase delay of position data of the moving body in response to a position command or a gain.

5. The control device according to claim 1,
wherein the first direction and the second direction are an X direction and a Y direction, respectively, of XY coordinates that are two orthogonal coordinates in one plane, and the moving body has a configuration capable of driving in the first direction and the second direction.

6. The control device according to claim 5,
wherein the controller comprises a PID compensator capable of adjusting control gains in the X and Y directions, and
the controlled amount calculating unit comprises a matrix operator configured to output the controlled amount of at least the first motor and the second motor based on the controlled amount in the X direction and the Y direction.

7. The control device according to claim 1, further comprising a third motor and a fourth motor in addition to at least the first motor and the second motor.

8. The control device according to claim 1,
wherein the moving body has a configuration capable of driving in an X direction and a Y direction of an XY coordinates that are two orthogonal coordinates in one plane, and in a θ direction that is a rotating direction rotationally centered on a center point of the XY coordinates.

9. The control device according to claim 8,
wherein the controller is configured to further output a seventh control signal pertaining to a θ direction based on a predetermined gain in the normal operation mode, and output an eighth control signal based on a gain set in the θ direction in the learning operation mode, and
the controlled amount calculating unit is further configured to receive the eighth control signal, and use the signal to calculate the characteristic differences between the first motor and the second motor.

10. The control device according to claim 8,
wherein the controller comprises a PID compensator capable of adjusting the control gain in the X, Y and θ directions, and
the controlled amount calculating unit comprises a matrix operator that outputs the controlled amount of at least the first motor and the second motor based on the controlled amount in each drive direction of the moving body.

11. The control device according to claim 8,
wherein the controlled amount calculating unit is configured to set the control gain in the θ direction to be smaller than the control gains in the X direction and the Y direction, or to set the control gain to be smaller in the normal operation mode, and to perform driving of the first motor and the second motor, and
to calculate the characteristic differences of at least the first motor and the second motor, using a detected rotation angle in the θ direction and instruction values or detected values in the X direction and the Y direction.

12. The control device according to claim 8,
wherein the controlled amount calculating unit is configured to set the control gain in the X direction to be smaller than the control gains in the Y and θ directions, or to set the control gain to be smaller in the normal operation mode, and to perform driving of the first motor and the second motor, and
to calculate the characteristic differences of at least the first motor and the second motor, using a detecting position in the X direction, and an instruction value or a detected value in the Y direction.

13. The control device according to claim 8,
wherein the controlled amount calculating unit is configured to set the control gain in the Y direction to be smaller than the control gains in the X and θ directions, or to set the control gain to be smaller in the normal operation mode, and to perform driving of the first motor and the second motor, and
to calculate the characteristic differences of at least the first motor and the second motor, using a detecting position in the Y direction and an instruction value or a detected value in the X direction.

14. The control device according to claim 1, wherein the controlled amount calculating unit is configured to calculate the characteristic differences of at least the first motor and the second motor generating driving forces in a same direction in the learning operation mode.

15. The control device according to claim 1, further comprising a third motor and a fourth motor,
wherein at least the first motor and the second motor generate driving forces in a third direction,
the third motor and the fourth motor generate driving forces in a fourth direction crossing the third direction, and
the controlled amount calculating unit is configured to detect the characteristic differences between a synthetic driving force of at least the first motor and the second motor and a synthetic driving force of the third motor and the fourth motor in the learning operation mode.

16. The control device according to claim 1,
wherein at least the first motor and the second motor are vibrators, respectively,
wherein vibrations are excited at the respective vibrators by applying respective alternate voltages, and
wherein the moving body is driven by driving forces due to friction forces with the vibrators.

17. The control device according to claim 1, wherein at least the first motor and the second motor are voice coil motors, respectively.

18. An actuator comprising:
the control device according to claim 1;
at least the first motor and the second motor;
the moving body; and
a position sensor that detects a position of the moving body.

19. An image blur correction device, comprising: the actuator according to claim 18; and
a lens,
wherein the apparatus moves the moving body of the actuator to move the lens.

20. An interchangeable lens, comprising:
a lens; and
the actuator according to claim 18 that moves the moving body to drive a lens holder holding the lens.

21. An image pickup apparatus, comprising:
an image pickup element;
a lens; and
the actuator according to claim 18 that moves the moving body to drive a lens holder holding the lens.

22. An image pickup apparatus, comprising:
a lens;
an image pickup element; and
the actuator according to claim 18 that moves the moving body to drive the image pickup element.

23. An automatic stage, comprising:
a stage; and
the actuator according to claim 18 that moves the moving body to drive the stage.

* * * * *